United States Patent [19]

Tsuji et al.

[11] Patent Number: 4,953,013
[45] Date of Patent: Aug. 28, 1990

[54] COLOR IMAGE PROCESSING DEVICE

[75] Inventors: Katsuhisa Tsuji; Tomoko Ogawa, both of Tokyo, Japan

[73] Assignee: Ricoh Company, Ltd., Tokyo, Japan

[21] Appl. No.: 253,620

[22] Filed: Oct. 5, 1988

[30] Foreign Application Priority Data

Oct. 8, 1987 [JP] Japan .................................. 62-252357
Jun. 8, 1988 [JP] Japan .................................. 63-139350

[51] Int. Cl.$^5$ .................................................. H04N 1/46
[52] U.S. Cl. ........................................ 358/75; 358/80; 358/447; 358/448; 358/453; 358/462
[58] Field of Search ............... 358/447, 448, 452, 453, 358/462, 467, 75, 80, 79, 81, 470; 382/12, 17, 22

[56] References Cited

U.S. PATENT DOCUMENTS

| | | | |
|---|---|---|---|
| 4,447,830 | 5/1984 | Stoffel | 358/462 |
| 4,547,811 | 10/1985 | Ochi et al. | 358/455 |
| 4,577,235 | 3/1986 | Kannapell et al. | 358/462 |
| 4,663,662 | 5/1987 | Sekizawa et al. | 358/80 |
| 4,680,642 | 7/1987 | Shimano et al. | 358/75 |
| 4,700,399 | 10/1987 | Yoshida | 358/80 |
| 4,707,745 | 11/1987 | Sakano | 358/456 |
| 4,739,397 | 4/1988 | Hayashi | 358/448 |

Primary Examiner—Edward L. Coles, Sr.
Assistant Examiner—Jerome Grant
Attorney, Agent, or Firm—Oblon, Spivak, McClelland, Maier & Neustadt

[57] ABSTRACT

A color image processing device including
a reader for reading an original image for each area containing a predetermined number of pixels of the original image and color-separating the read area into red, green and blue components,
a character area detector for detecting whether or not the area read by the reader is a character area constituting a part of a character in the original image for each of the red, green and blue components, and
a black character area determinator adapted to determine the area read by the reader to be a black character area constituting a part of a black character in the original image if said area is detected to be the character area for all of the red, green and blue components by the character area detector.

13 Claims, 23 Drawing Sheets

Fig. 3
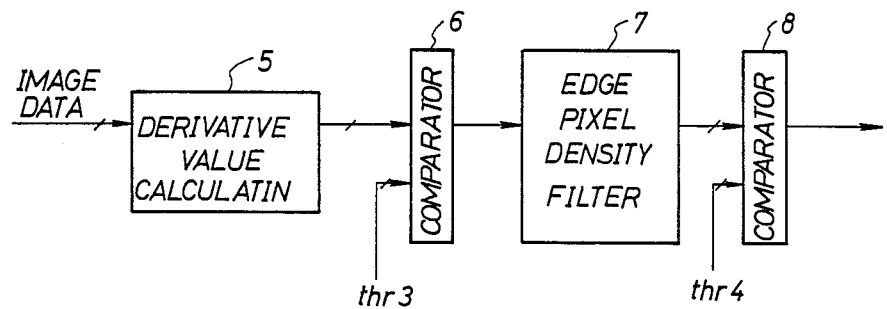
Fig. 4
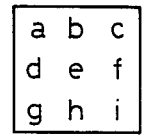
Fig.5a  Fig.5b  Fig.5c  Fig.5d  Fig.5e
| 0  1  0 | | 1  0  1 | | 1  2  1 | | 1  1  1 | | 1  1  1 |
| 1 -4  1 | | 0 -4  0 | | 2 -12 2 | | 1 -8  1 | | 0  0  0 |
| 0  1  0 | | 1  0  1 | | 1  2  1 | | 1  1  1 | |-1 -1 -1 |
Fig.5f  Fig.5g  Fig.5h  Fig.5i  Fig.5j
| 1  0 -1 | | 1  1  0 | | 0  1  1 | | 1  2  1 | | 1  0 -1 |
| 1  0 -1 | | 1  0 -1 | |-1  0  1 | | 0  0  0 | | 2  0 -2 |
| 1  0 -1 | | 0 -1 -1 | |-1 -1  0 | |-1 -2 -1 | | 1  0 -1 |
Fig.5k  Fig.5l  Fig.5m  Fig.5n
| 1  1 | | 1 -1 | | 1  0 | | 0  1 |
|-1 -1 | | 1 -1 | | 0 -1 | |-1  0 |

Fig. 6
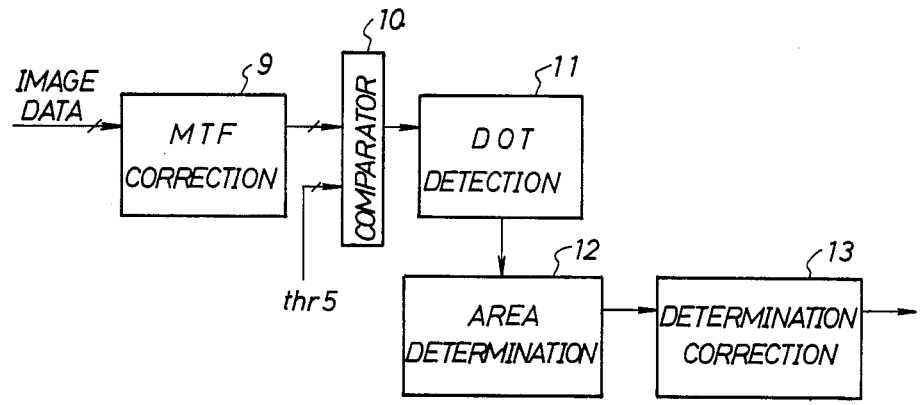
Fig. 7
|  | $M_{1j}$ | $M_{2j}$ | $M_{3j}$ | $M_{4j}$ | $M_{5j}$ | $M_{6j}$ | $M_{7j}$ |
|---|---|---|---|---|---|---|---|
| $M_{i1}$ |  |  | △ | △ | △ |  |  |
| $M_{i2}$ |  | △ | × | ⊗ | × | △ |  |
| $M_{i3}$ | △ | × | ○ |  | ○ | × | △ |
| $M_{i4}$ | △ | ⊗ |  | $M_{44}$ |  | ⊗ | △ |
| $M_{i5}$ | △ | × | ○ |  | ○ | × | △ |
| $M_{i6}$ |  | △ | × | ⊗ | × | △ |  |
| $M_{i7}$ |  |  | △ | △ | △ |  |  |
Fig. 8
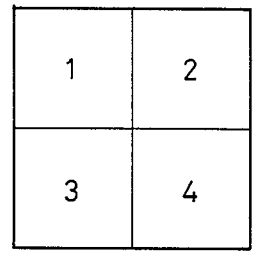

Fig.9a

| -1/2 | -1 | -1/2 |
|---|---|---|
| -1 | 7 | -1 |
| -1/2 | -1 | -1/2 |

Fig.9b

| 0 | -1/2 | 0 |
|---|---|---|
| -1/2 | 3 | -1/2 |
| 0 | -1/2 | 0 |

Fig.9c

| -1/2 | 0 | -1/2 |
|---|---|---|
| 0 | 3 | 0 |
| -1/2 | 0 | -1/2 |

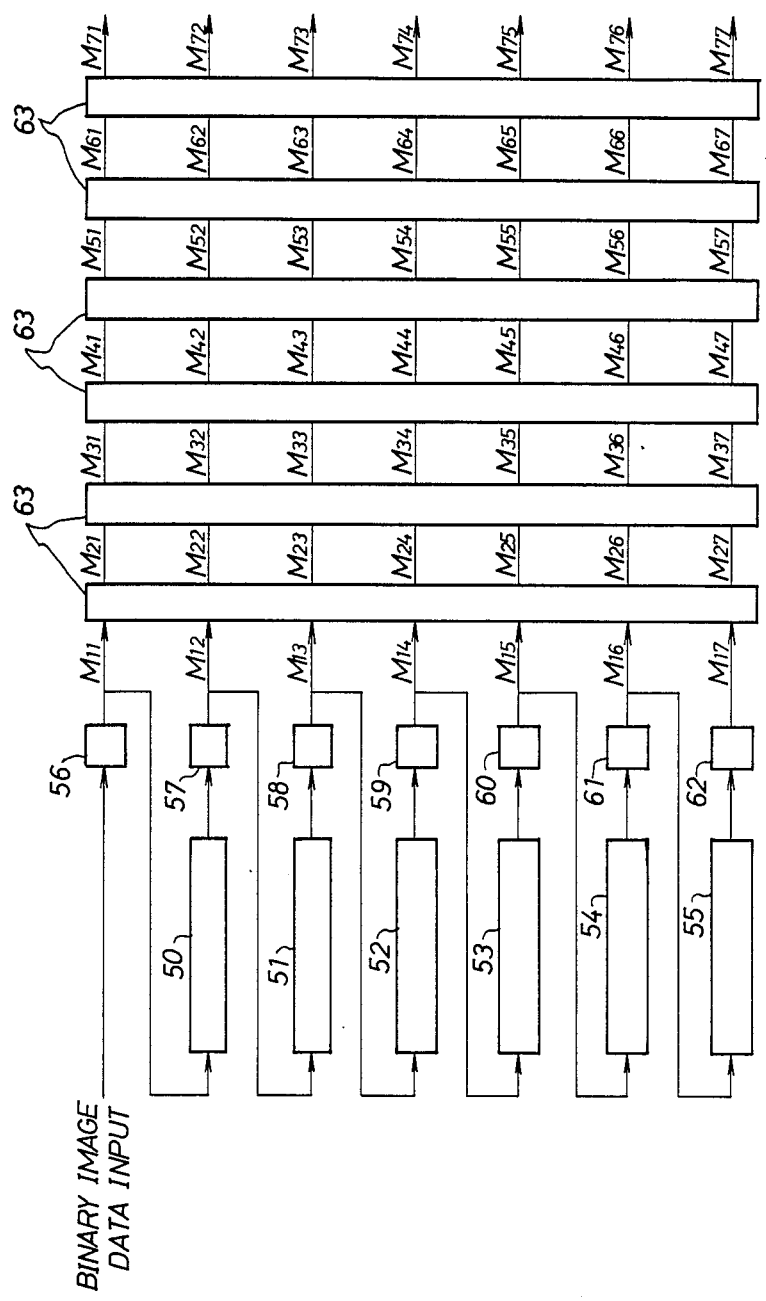

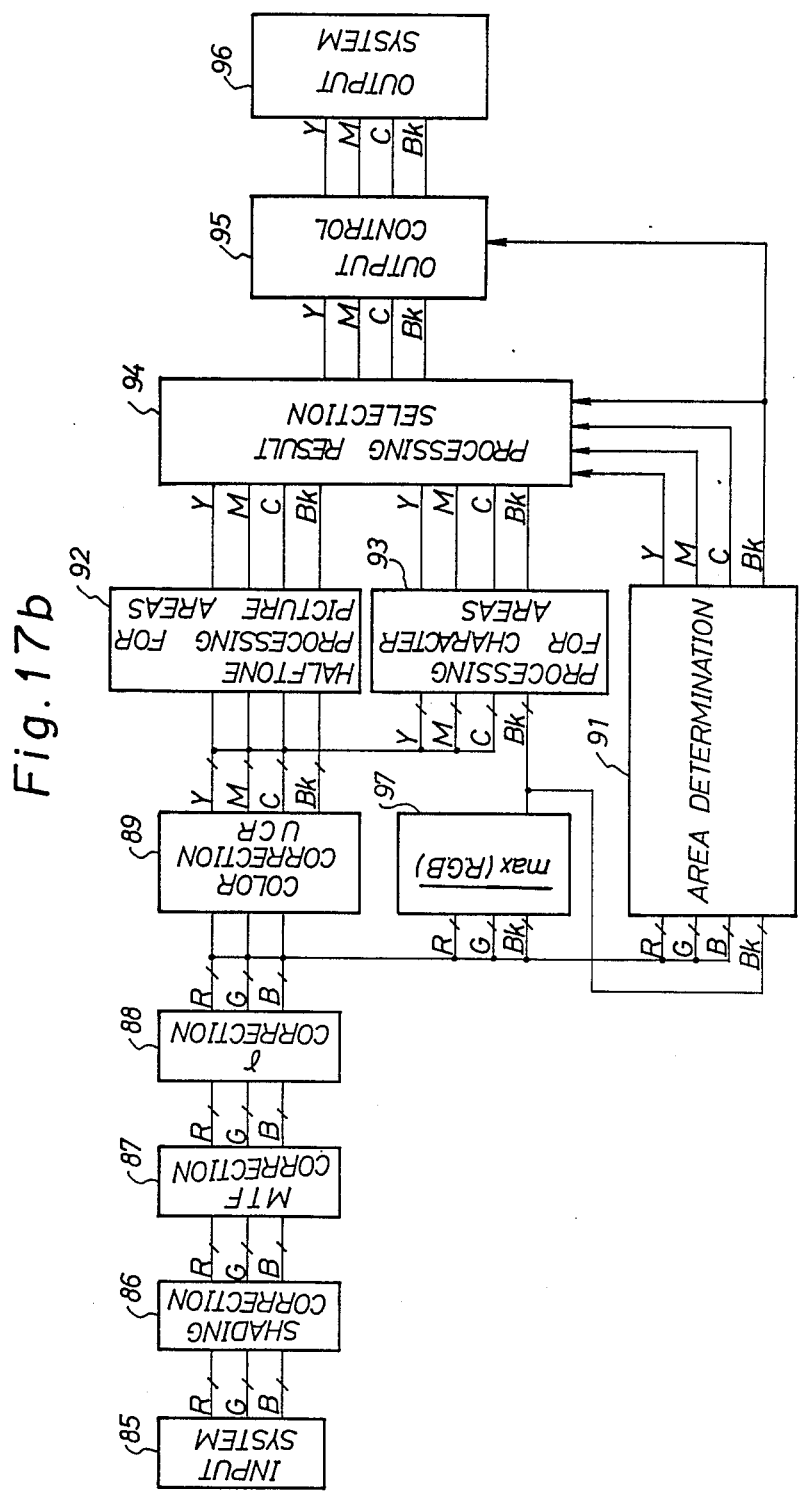

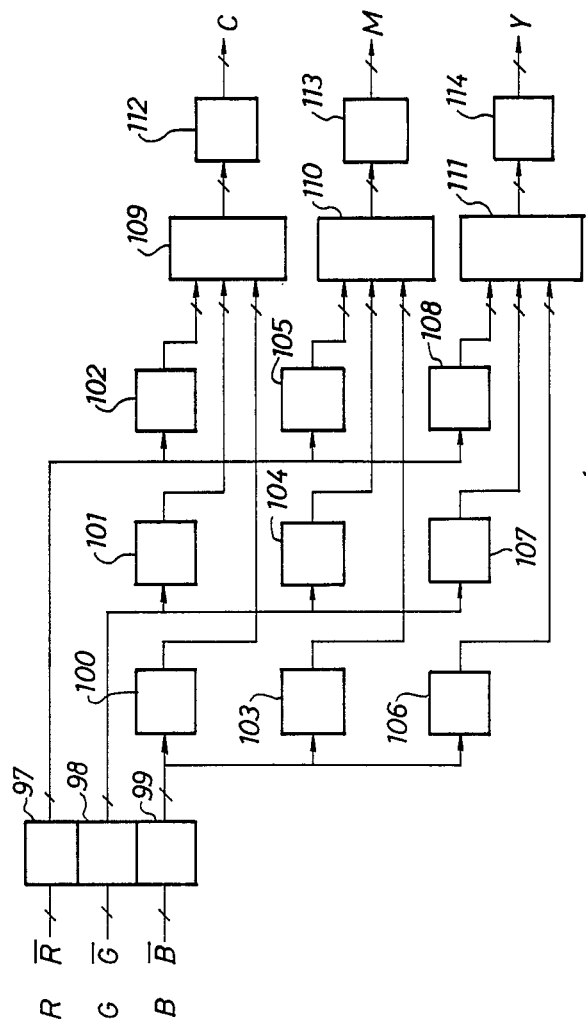

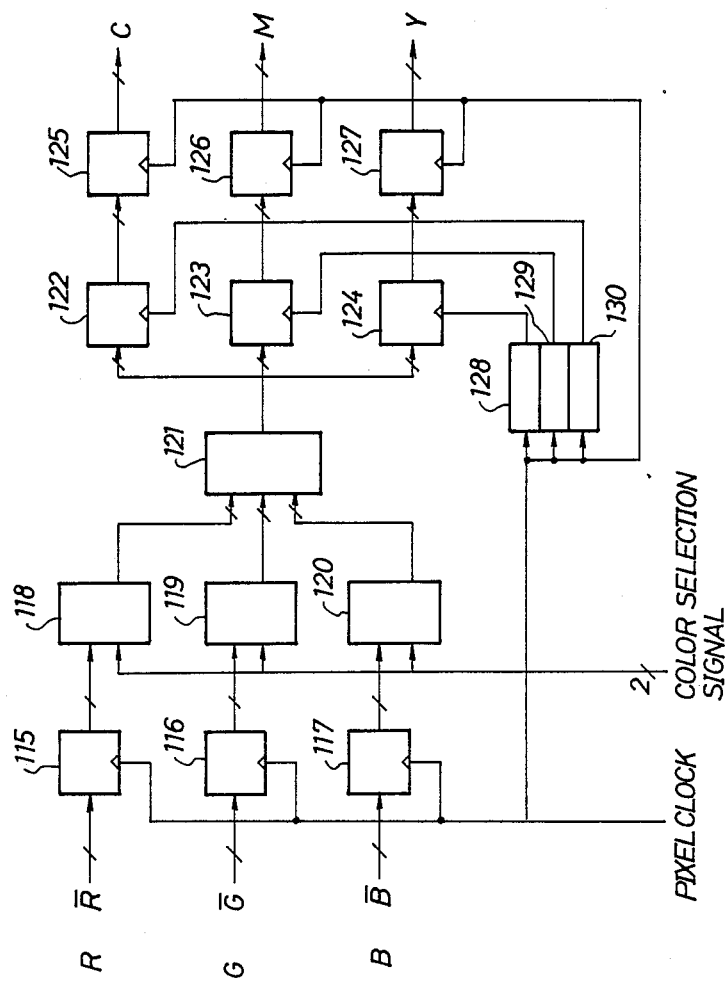

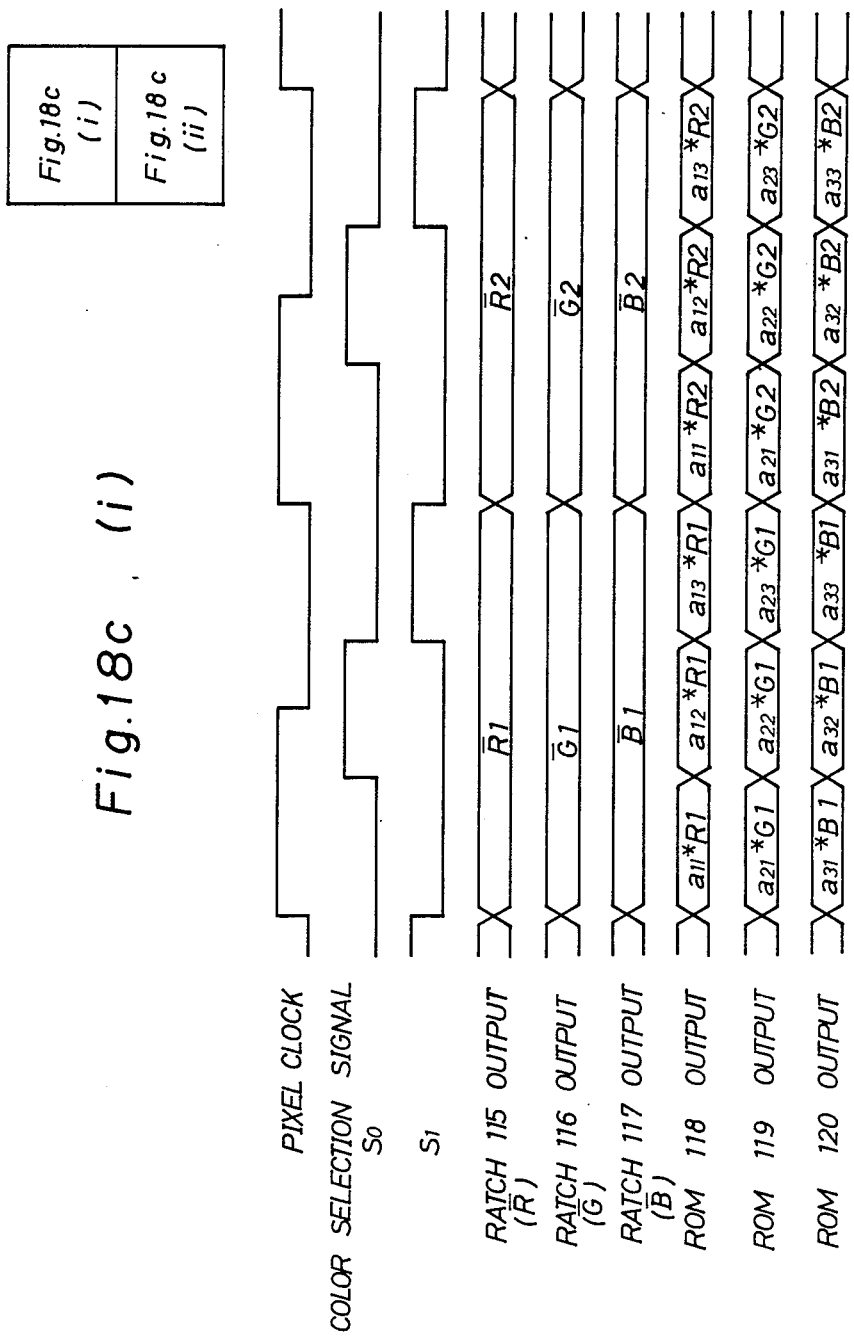

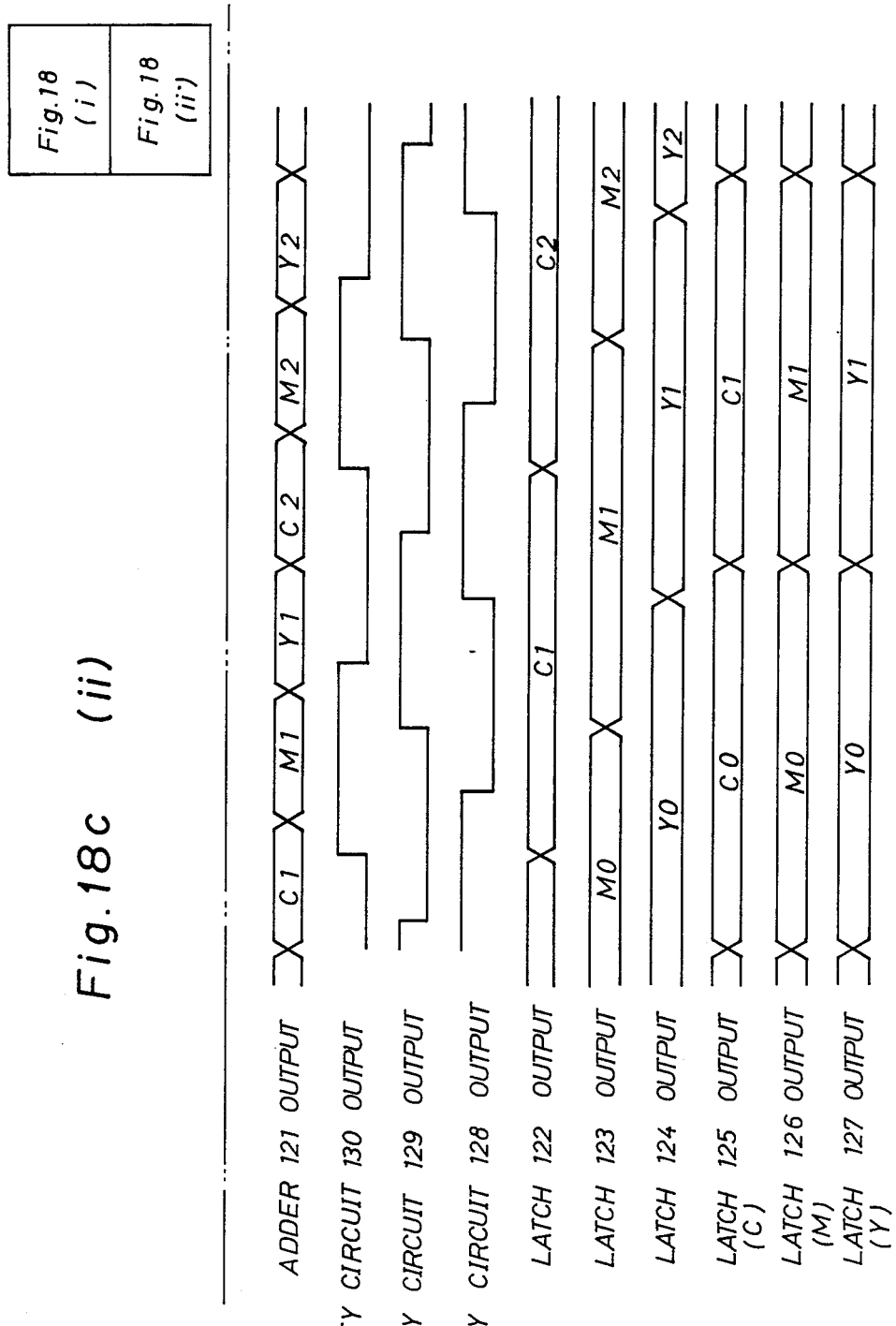
Fig.18c (ii)

COLOR IMAGE PROCESSING DEVICE

BACKGROUND OF THE INVENTION

1. Field of the Invention

The present invention relates to a device for processing image signals of an original image to reproduce the original image, which is capable of clearly reproducing black characters in case the original image is composed of black characters and color pictures. The device of the present invention is particularly suitable for use in digital color reproduction machines and color facsimile equipment.

2. Description of Background

In color documents comprising therein pictures and characters, the characters are black in most cases. For reproducing black color in color reproduction machines, three color materials, i.e., yellow (Y), magenta (M) and cyan (C), are superimposed on each other. However, perfect black color cannot be obtained unless Y, M and C are perfectly balanced. Also, misalignment of those Y, M and C color materials results in quite indistinct images reproduced, especially, black characters. In order to cope with such a drawback, the prior art utilizes UCR (Under Color Removal) processing in which Y, M and C color materials are replaced by a single black color material in the areas where those three color materials are to be superimposed. Provided that an image reading scanner of color reproduction machines has ideal characteristics, black characters read by the scanner and subjected to color separation into red, green and blue components, could be printed on a paper with a black color material alone using the UCR processing because magnitudes of respective color components should be equal with respect to each other, i.e., $R=G=B=O$. However, characteristics of the actual scanner are different from those of the ideal one, so the magnitudes of the respective color components cannot be perfectly equal with respect to each other when reading black characters and subjecting them to color separation. An example of the prior art UCR discussed above is reflected by U.S. Pat. No. 4,700,399, wherein the edge intensity is detected by use of a Laplacian filter and the amount of UCR is increased in proportion to the edge intensity of the picture element (pixel). The purpose of this patent is to provide an improved reproducibility of black characters. It must be noted that in this prior art only the control of the UCR amount is performed. In this instance, when the gray balance of R, G and B is incomplete, the color components remain. Thus, the positional shear (slippage) appears between Y, M, C and black. As a consequence, blotting or blurring of color materials for color printing occurs around the black characters so that the image quality of the black picture is deteriorated. Therefore, in spite of using the UCR processing, the black characters are printed on a paper with mixture of black and other color materials.

SUMMARY OF THE INVENTION

The present invention has been accomplished in view of the foregoing, and its object is to provide a color image processing device in which an image signal is processed to clearly reproduce black characters.

The object of the invention is attained by a color image processing device including:

a reader for reading an original image for each area containing a predetermined number of pixels of the original image and color-separating the read area into red, green and blue components, a character area detector for detecting whether or not the area read by the reader is a character area constituting a part of a character in the original image for each of the red, green and blue components, a black character area detector for characterizing the area read by the read means as a black character area constituting a part of a black character in the original image when said area is detected by the character area detector to be a character area for each and every one of the red, green and blue components.

The object of the invention is also attained by a color image processing device including:

a reader for reading an original image for each area containing a predetermined number of pixels of the original image and color-separating the read area into red, green and blue components;

a black component extractor for extracting black component of the area read by the read means based on the red, green and blue components of the area separated by the read means;

a character area detector for detecting whether or not the area read by the read means is a character area constituting a part of a character in the original image for each of red, green, blue and black components; and a black character area detector for characterizing the area read by the reader as a black character area constituting a part of a black character in the original image when said area is detected by the character area detector to be a character area for each and every one of the red, green, blue and black components.

The above and other features and advantages of the present invention will be apparent from the following description of preferred embodiments shown in the accompanying drawings.

BRIEF DESCRIPTION OF THE DRAWINGS

FIG. 3 is a circuit diagram for implementing a later-described algorithm 2;

FIG. 4 is a schematic view showing one example of the size of a differentiating filter used in the circuit of FIG. 3;

FIGS. 5(a)–5(n) are schematic views showing examples of the differentiating filter in FIG. 3;

FIG. 6 is a circuit diagram for implementing a later-described algorithm 3;

FIG. 7 is a schematic view showing one example of a template used in the circuit of FIG. 6;

FIG. 8 is a schematic view for explaining correction of dot area determination;

FIGS. 9(a)–9(c) are schematic views showing examples of a two-dimensional high-frequency range enhancing filter for use in MTF correction;

FIGS. 17(a)–17(c) and FIG. 19 are circuit diagrams of embodiments of the color image processing device according to the present invention;

FIGS. 18(a) and 18(b) are block diagrams showing examples of a color correction circuit;

FIG. 18(c) is a time chart for explaining operation of FIGS. 18(a) and 18(b);

DETAILED DESCRIPTION OF THE PREFERRED EMBODIMENTS

An area determination circuit usable in the color image processing device of the present invention will be described with reference to FIGS. 1–14. The purpose of the area determination circuit is to determine whether the area comprised of the predetermined number of pixels is a picture area for representing a picture or a character area for representing a character. Whether the relevant area is a picture area or a character area can be determined by either the method of detecting the number of those pixels inside the area which have density not less than a background level, the method of detecting the number of so-called edge pixels inside the area which are abruptly changed in density, or the method of detecting whether or not the area is a dot area consisting of dots adapted to represent a half tone.

Figure 1:
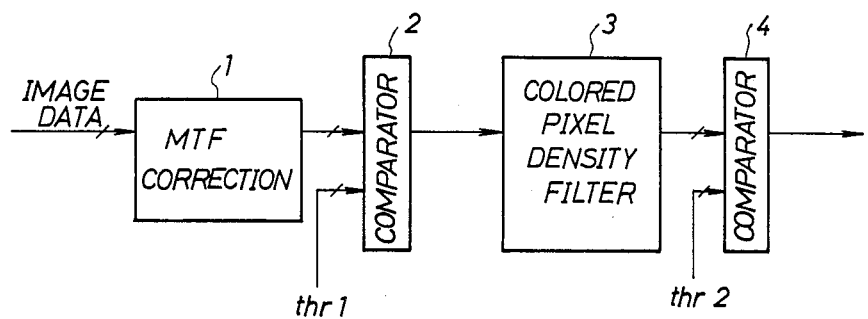
FIG. 1 is a circuit diagram for implementing a later-described algorithm 1.

FIG. 1 shows a circuit corresponding to the method of detecting the number of those pixels which have density not less than a background level (hereinafter referred to as algorithm 1). In the picture area, most of pixels inside the area are those pixels which have a density of not less than a background level (hereinafter referred to as colored pixels), while in the character area, the number of colored pixels is relatively small. Therefore, whether the relevant area is a picture area or a character area can be determined by comparing the number of colored pixels inside the area with a predetermined number (threshold).

Referring to FIG. 1, there is shown an MTF (Modulation Transfer Function) correction unit 1, a comparator 2, a colored pixel density filter 3, a comparator 4, and preset thresholds thr 1, thr 2

This algorithm (1) is likely to invite erroneous determination if edge portions of the character are blurry to a large extent. Therefore, it is desired to apply MTF correction (high-frequency enhancement) in the MTF correction unit 1.

The comparator 2 determines those pixels, which have density equal to or higher than the preset threshold thr 1, to be colored pixels, and those pixels, which have density lower than the threshold thr 1, to be background level pixels. The colored pixel density filter 3 at the next stage has a scan window corresponding to the area of size as large as 4×4–8×8 pixels. As mentioned above, since substantially all of pixels of the picture area within the scan window are colored pixels, the threshold thr 2 used for area determination may be set any value in a range of N to N-2, assuming that the number of pixels within the scan window is given by N. The comparator 4 determines that an area which has a number of pixels, which have beforehand been determined to be colored pixels, and which number is equal to or larger than the preset threshold thr 2 is a picture area, and any area other than as defined above is a character area.

Figure 2A:
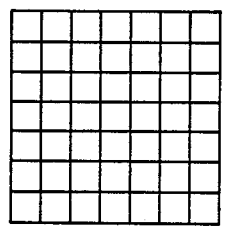
FIGS. 2(a)–2(f) are schematic views showing examples of a pattern for use in a colored pixel density filter.
Figure 2B:
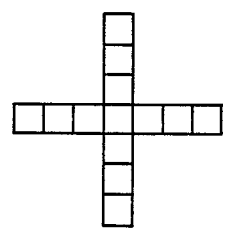
Figure 2C:
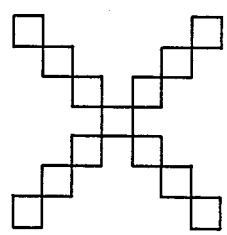
Figure 2D:
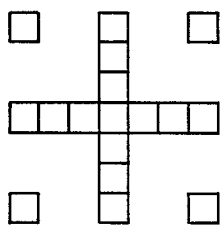
Figure 2E:
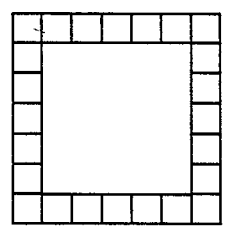
Figure 2F:
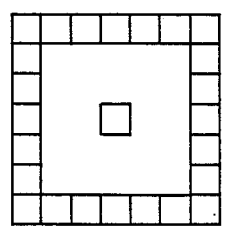

Although the scan window may have the size of 7×7 pixels as shown in FIG. 2(a), for example, it is not necessary to make determination for all of 49 pixels as to whether they are colored pictures or not. The configuration of hardware can be simplified by utilizing only a part of the pixels as illustrated in FIGS. 2(b), 2(c), 2(d), 2(e) and 2(f).

FIG. 3 shows a circuit corresponding to the method of detecting the number of so-called edge pixels inside the relevant area which are abruptly changed in density (hereinafter referred to as algorithm 2).

In the picture area, the portions where density is abruptly changing are few and hence the number of edge pixels is small. On the contrary, the number of edge pixels is large in the character area. Thus, whether the relevant area is a picture area or a character area can be determined by comparing the number of edge-pixels inside the area with a predetermined number (threshold).

Referring to FIG. 3, there is shown a derivative value calculation unit 5, a comparator 6, an edge pixel density filter 7, a comparator 8, and thresholds thr 3, thr 4.

The extraction of the edge picture elements can be accomplished by either primary differentiation filters or secondary differentiation filters. Either of these filters can be used as the unit 5 shown in FIG. 3. The following description provides the instance of using a primary differentiation filter wherein the term "density slope" corresponds to primary differentiation.

The comparator 6 determines those pixels, which have a density slope equal to or higher than the preset threshold thr 3, to be edge pixels, and those pixels, which have a density slope lower than the threshold thr 3, to be non-edge pixels. The comparator 8 determines that an area which has a number of edge pixels, which have beforehand been determined to be edge pixels, and which number is equal to or larger than the preset threshold thr 4 is a character area, and any area other than as defined above is a picture area. The edge pixel extraction is generally performed by a method using the magnitude of the secondary derivative value (Laplacian) or primary derivative value (gradient).

The density slope (derivative value) of a given pixel is dependent on densities of respective surrounding pixels. For example, the density slope of pixel (e) at the center of the area shown in FIG. 4 is defined by the following equation:

$$\max\left(\frac{|a-e|}{\sqrt{2}}, |b-e|, \frac{|c-e|}{\sqrt{2}}, |d-e|,\right.$$

$$\left.|f-e|, \frac{|g-e|}{\sqrt{2}}, |h-e|, \frac{|i-e|}{\sqrt{2}}\right)$$

where a through e represent gradation levels of the respective pixels. In place of the above maximum value, the mean value or sum of absolute level differences between the given pixel and the surrounding pixels may be defined as a density slope of the given pixel.

The density slope (derivative value) can be calculated by making use of filters as shown in FIG. 5, these filters are used as the derivative value calculation unit 5 of FIG. 3. FIGS. 5(a)-5(d) show the filters for calculating the secondary derivative values, and FIGS. 5(e)-5(n) show the filters for calculating the primary derivative values. Since the filters for calculating the primary derivative values have directionality, it is preferable that the squared mean value, mean value, or maximum value of outputs from two filters, which have their directionalities orthogonal to each other, is used as the primary derivative value.

The calculated density slope is compared with the threshold thr 3 in the comparator 6. The threshold thr 3 can be a fixed value. Alternatively, it may be varied depending on the background level of a document. The edge pixel density filter 7 has the size, such as 3×3-8×8 pixels, corresponding to the area to be processed. The comparator 8 compares the number of pixels inside the filter 7, which have beforehand been determined to be edge pixels, with the threshold thr 4 to detect whether or not the area is a character area.

FIG. 6 shows a circuit corresponding to the method of detecting whether or not the relevant area is a dot area consisted of dots adapted to represent a half tone (hereinafter referred to as algorithm 3). Referring to FIG. 6, there is shown an MTF correction unit 9, a comparator 10, a dot detector 11, an area determination unit 12, a determination correcting unit 13, and a threshold thr 5. Although the pattern matching technique is utilized in the circuit of FIG. 6, the dot size is changed depending on the gradation level, the dot pitch, or the like, and hence a plurality of templates should be employed. FIG. 7 shows example of such templates. In FIG. 7, respective pixels within the scan window are represented by Mij. Symbols o, x, Δ indicate three different types of templates, respectively.

When any one of the following conditions (1), (2) or (3) is satisfied, the pixel M44 is regarded as a black dot:
(1) M44=black and all pixels at symbol o=white
(2) M44=black and all pixels at symbol x=white
(3) M44=black and all pixels at symbol Δ=white.
When any one of the following conditions (4), (5) and (6) is satisfied, the pixel M44 is regarded as a white dot:
(4) M44=white and all pixels at symbol o=black
(5) M44=white and all pixels at symbol x=black
(6) M44=white and all pixels at symbol Δ=black.

Then, the image is divided into blocks of size as large as 8×8-16×16 pixels, and those blocks in which at least one dot have been found are determined to be dot areas. To prevent erroneous determination due to noises or the like, the determination is corrected at the next stage. For example, as shown in FIG. 8, if three blocks, i.e., block 1, block 2 and block 3, are all determined to be dot areas, the remaining one block (block 4) is also regarded as a dot area. To the contrary, if two or less among the four blocks have been determined to be dot areas, all of the four blocks are regarded as non-dot areas.

The device for implementing the algorithm 1, shown in FIG. 1, will now be described in more detail.

The image data read by a scanner (not shown) is required to compensate for deterioration in the high-frequency range through the MTF correction unit 1. The MTF correction unit 1 comprises a digital filter with high-frequency enhancing characteristics.

FIGS. 9(a), 9(b) and 9(c) show examples of the two-dimensional high-frequency range enhancing filter suitable for MTF correction.

The Modulation Transfer Function (MTF) is an amplitude transmission characteristic with regard to the spatial frequency. The MTF of the input system differs in accordance with the shape and other characteristics of the lens or the aperture which is used. In general, the transmission characteristics are not as good when high-frequency components are used. For this reason, gradation (shading off) is included in the input image. In order to correct the gradation, the deteriorated high-frequency component must be restored to its former condition. That is, the high-frequency components must be emphasized. The treatment of this high-frequency component in order to provide compensation of the MTF is called "MTF compensation". Because a high-frequency area emphasizing filter is used to perform the MTF compensation, the technical terms; "MTF compensation" and "high-frequency area emphasizing (enhancing) treatment", are used synonymously.

The compensation of the gradation which is performed by means of the high-frequency area enhancing filter which is used and exemplified in FIGS. 9(a)-9(c) is described in detail in "A. Rosenfeld, A. C. KAK; Digital Picture Processing; Academic Press, 1976". Furthermore, the exemplary embodiment of applying the MTF compensation technology to facsimile or the like is described in Japanese laid-open patent application JOP57-53179/1982.

Respective factors of each filter should be selected in accordance with frequency characteristics of the input system. Although the filters of 3×3 size are illustrated in FIGS. 9(a)-9(c) other filters of larger sizes such as 5×3 or 5×5 pixels can also be used for better correction. Alternatively, the factors may have different values in main scan and sub-scan directions for matching with frequency characteristics of the actual input system. Further, use of the filters having pixels in four directions only, as shown in FIGS. 9(b) and 9(c), makes it possible to simplify the configuration of hardware.

The filter coefficients shown in FIGS. 9(a)-9(c) are exponents of the number "2". When constructed in terms of hardware, multiplication is realized by shifting bits without using the multiplier so the device can be constructed at low cost. The value is determined in accordance with the value obtained by measuring the MTF characteristic value of the input system. The FIGS. 9(a)-9(c) show coefficients for embodiments frequently used as high-frequency area emphasizing (enhancing) filters.

Figure 10:
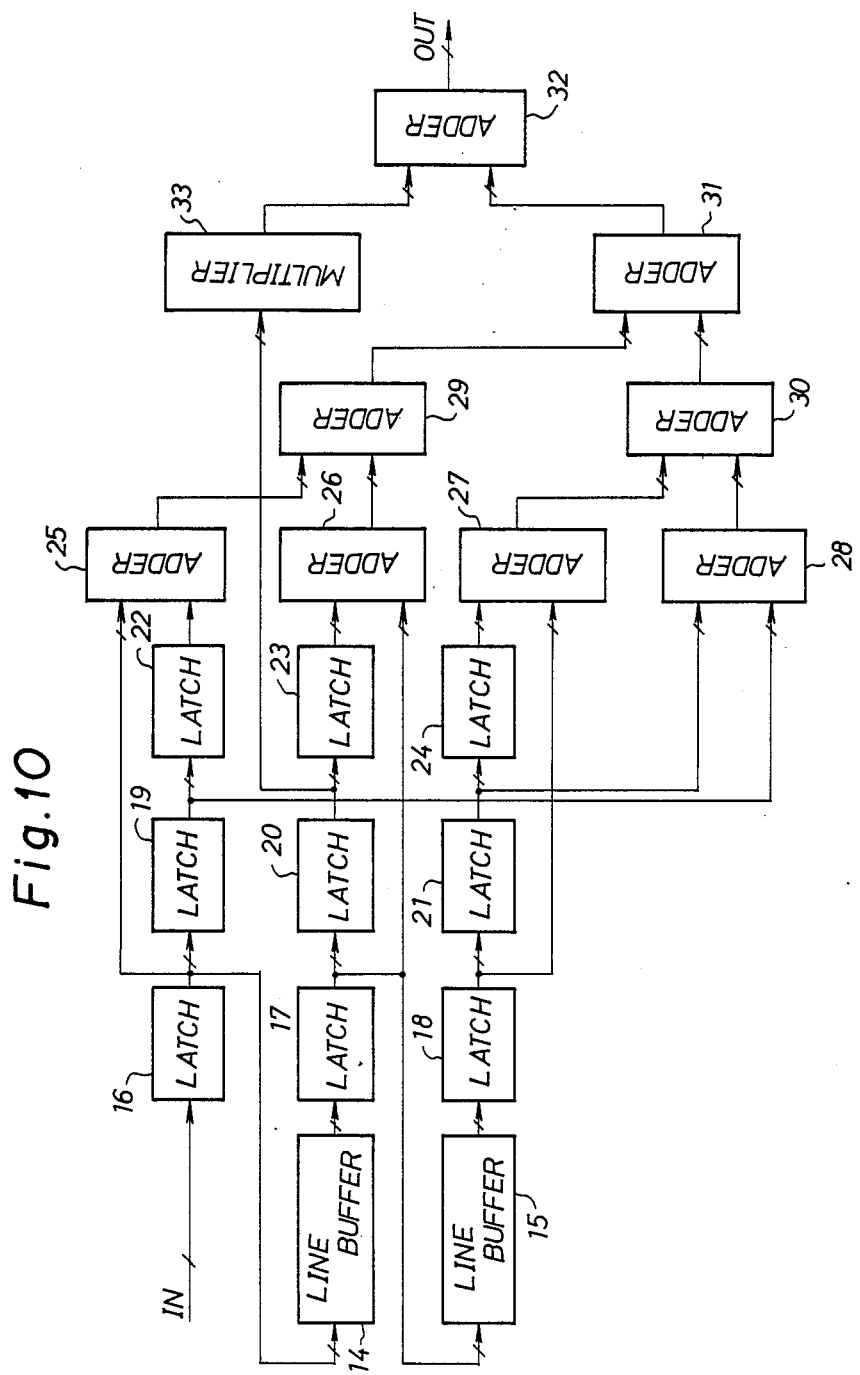
FIG. 10 is a circuit diagram of the two-dimensional high-frequency range enhancing filter of 3×3 matrix.

FIG. 10 is a circuit diagram of the two-dimensional high-frequency range enhancing filter of 3×3 size. For implementing the arithmetic operation of 3×3 matrix, this circuit has two line buffers and 3×3=9 latches. In FIG. 10, designated at 14, 15 are line buffers, at 16-24 latches, at 25-32 adders, and at 33 is a multiplier.

The data of 9 latched pixels are processed with the adders 25-32 and the multiplier 33. As an alternative, the circuit may use ROMs (Read Only Memory) in place of the adders 25-32 and the multiplier 33, for simpler matrix operation with optional factors.

The optional factors referred to factors which exclude the filter coefficients shown in FIGS. 5(a)-5(n) and 9. These coefficients shown in the FIGS. 5(a)-5(n)

and FIGS. 9(a)–9(c) are representative examples, but various modifications are possible.

Figure 11:
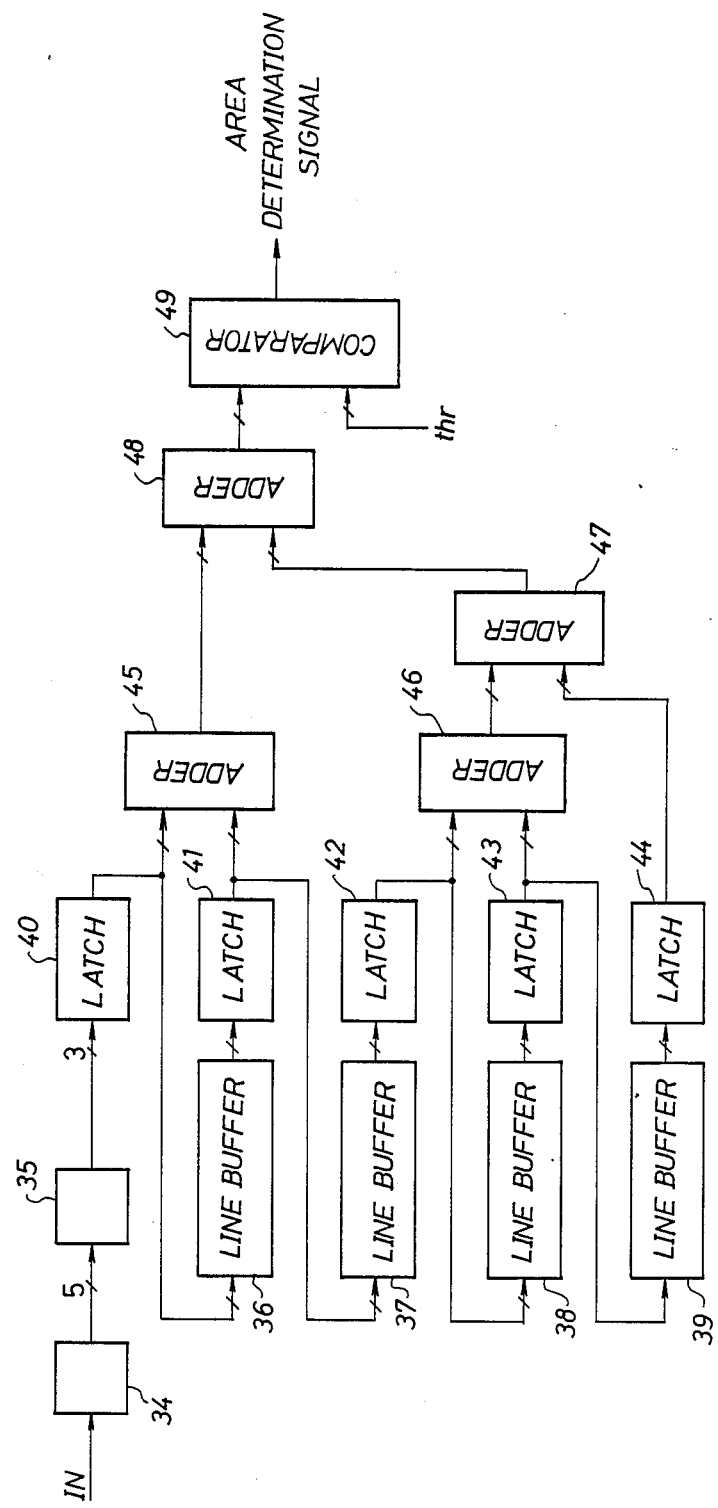
FIG. 11 is a circuit diagram of the colored pixel density filter and a comparator.

FIG. 11 shows a circuit diagram of the colored pixel density filter 3 and the comparator 4. In FIG. 11, there is shown a shift register 34, a counter 35, line buffers 36–39, latches 40–44, adders 45–48, and a comparator 49.

The colored pixel density filter 3 shown here counts the number of colored pixels within the scan window of 5×5 size. More specifically, each pixel data of 1 bit having been binary-coded by the comparator 2 is inputted to the shift register 34. The shift register 34 outputs the binary data of 5 pixels (5 bits in total) in the main scan direction. The counter 35 at the next stage counts the number of colored pixels per 5 pixels in the main scan direction.

The numbers of colored pixels per 5 pixels in the main scan direction for 5 lines are held in each of the latches 40–44 and then added by the adders 45–48, so that the number of colored pixels per 5×5=25 pixels is calculated. The thus-calculated number of colored pixels is compared with the predetermined threshold thr 2 (approximately 25–23). As a result of the comparison, if that number is equal to or larger than the threshold thr 2, the area determination signal of "0" (indicative of a picture area) is delivered, and if it is smaller than the threshold thr 2, the area determination signal of "1" (indicative of a character area) is delivered.

The device for implementing the algorithm 2 shown in FIG. 3 will now be described in more detail. The derivative value calculation unit 5 can be realized by a circuit similar to the circuit shown in FIG. 10. In this case, the filter factors shown in FIGS. 5(a)–5(n) may be used.

In order to perform filtering by means of a general filter coefficient in FIGS. 5(a)–5(n) and in FIG. 9, a multiplier must be connected between the latches 16–24 and the adders 25–28 of FIG. 10. This multiplier multiplies the picture element data respectively latched in the latches 16–24 by the filter coefficients corresponding to the respective picture elements. Subsequently, the respective multiplication results are input into the adders 25–28.

In the embodiment of FIG. 10, all of the filter coefficients of the circumferential eight picture elements (the picture elements of the positions a, b, c, d, f, g, h and i) shown in FIG. 4 are equal to "1". The filter coefficients of the picture element which is to be recognized (the picture element of the position e shown in FIG. 4) is not disclosed in FIG. 10. However, assuming that the coefficient of the multiplier 33 is equal to −8, the filter coefficient is equal to a calculated differential (derivative) value shown in FIG. 5(d).

The examples of the edge extracting filter are shown in FIGS. 5(a)–5(n) and the size of the filter is not limited to a 3×3 and 2×2. Other filters may be used such as 5×5, 5×3, or others. Furthermore, with respect to the filter coefficient, the FIGS. 5(a)–5(d) show the representative examples of secondary differentiation while FIGS. 5(e)–5(n) show the representative examples of primary differentiation.

For the edge pixel density filter 7 and the comparator 8, a circuit similar to the circuit shown in FIG. 11 can be employed. If the number of edge pixels is equal to or larger than the predetermined threshold thr 4, the signal of "1" (indicative of a character area) is delivered, and if it is smaller than the threshold thr 4, the signal of "0" (indicative of a picture area) is delivered from the comparator 8.

The device for implementing the algorithm 3 shown in FIG. 6 will now be described in more detail.

FIGS. 12(a)–12(e) shows examples of the dot detector 11. Shown in FIG. 12(a) is a circuit adapted to prepare the data of 49 pixels within the scan window of 7×7 size, the circuit comprising line memories 50–55 for 6 full lines and latches 56–63 for 7×7=49 bits. The binary data M11–M77 for 49 pixels can be taken out from the group of latches 56–63 simultaneously.

Figure 12:
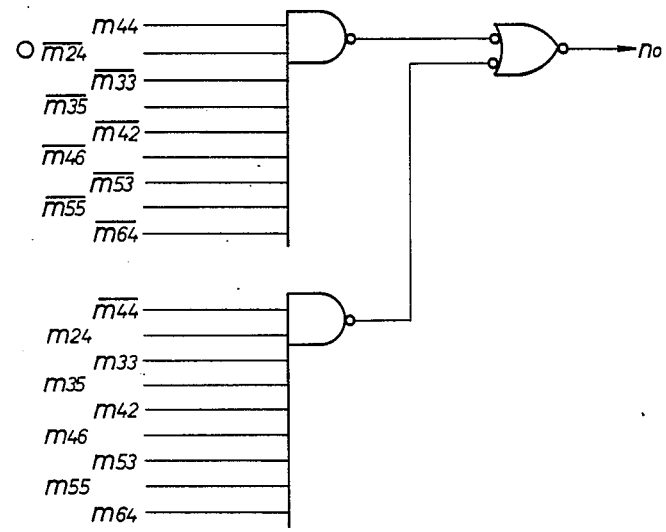
FIGS. 12(a)–12(e) are schematic views showing examples of a dot detector.
Figure 12:
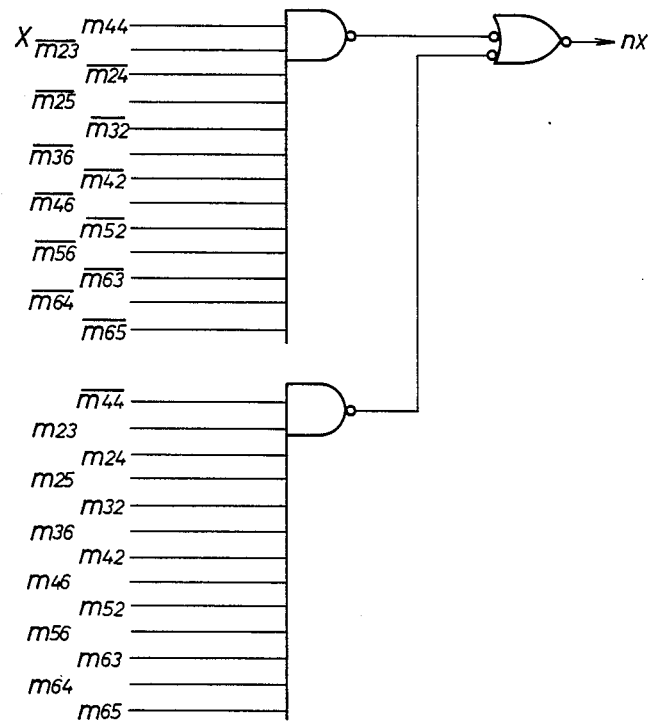
Figure 12D:
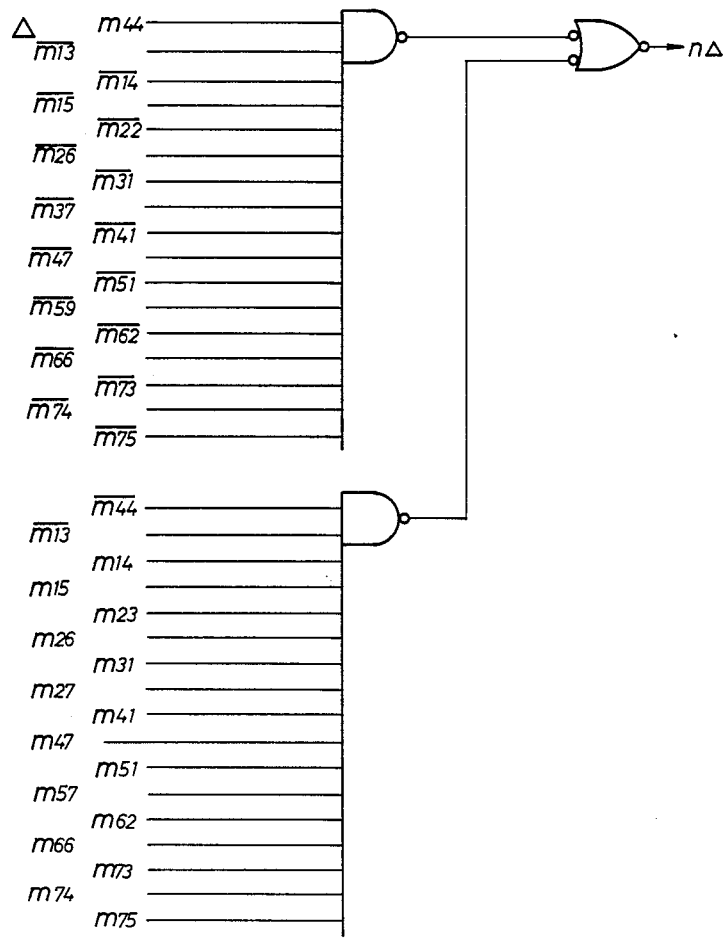
Figure 12E:
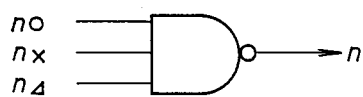

FIGS. 12(b), 12(c) and 12(d) show circuits for implementing the three types of templates (o, x, Δ), respectively. The signals no, nx and nΔ are inputted to a gate shown in FIG. 12(e) which in turn delivers the logical sum of the inputs as a dot detection signal n.

The output signal no is equal to 0 when the condition (1) or (4) are realized. In a similar manner the output signal nx is 0 when the condition (2) or (5) is realized and lastly, the output signal nΔ is 0 when the condition (3) or (6) are met. These conditions refer to the previously discussed conditions for the pixel M44. The detail previously discussed wherein when the value of black is given this signifies the value equal to "1" whereas white signifies "0".

Stated in another manner, the respective outputs no, nx, nΔ are 0 when the net points fitted for the respective templates are detected. The signal n="1" when at least one of no, nx and nΔ is equal to "1". That is, signal n turns out to be equal to 1 when at least one of the output signals no, nx and nΔ is fitted for one of the respective three kinds of templates. When the net point is detected, the signal n turns out to be equal to "1".

Figure 13:
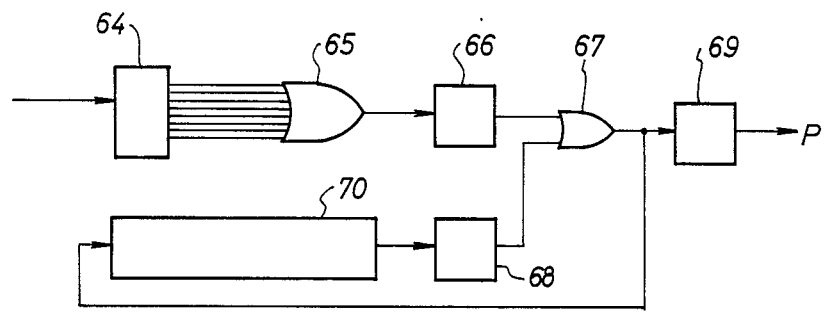
FIG. 13 is a block diagram showing one example of an area determination unit 12 of FIG. 6.

FIG. 13 shows one example of the area determination unit 12. In FIG. 13, designated at 64 is a 8 bit serial-to-parallel converter, at 65 first OR gate, at 66 first latch, at 67 second OR gate, at 68 second latch, at 69 third latch, and at 70 is a line memory.

This circuit functions to detect the presence or absence of dot per block of 8×8 size and then output a dot area determination signal P. More specifically, if at least one dot is detected within the block of 8×8 size, the output of P=1 is issued. Otherwise, the output of P=0 is issued. The dot detection signals n for every 8 pixels in the main scan direction are inputted to the 8 bit serial-to-parallel converter 64.

The first OR gate 65 at the next stage issues an output signal set to logical 1 when any one of 8 bits (8 pixels) exhibits logical 1. The signal indicative of the presence or absence of dot from the first OR gate 65 is passed through the first latch 66 and the second OR gate 67 for storage into the line memory 70.

Therefore, the signal indicative of the presence or absence of dot for every 8 pixels on the first line is stored in the line memory 70. When the dot detection signal n for 8 pixels on the second line are inputted, the first OR gate 65 outputs the signal indicative of the presence or absence of dot for 8 pixels on the second line. At the same time, the signal indicative of the presence or absence of dot for 8 pixels on the first line is outputted from the line memory 70. When, the second OR gate 67 outputs a signal indicative of whether at least one dot is present or absent in the block of 8×2 size. In a like manner, when the dot detection signal n for 8 pixels on the eighth line is inputted, the second OR gate 67 now outputs the dot area determination signal P indicative of whether at least one dot is present or absent in the block of 8×8 size. The dot area determination signal P is held in the third latch 69, while the first latch 66, second latch 67 and line memory 70 are cleared and readied for dot area determination of the subsequent block on the 9th-15th lines.

Figure 14:
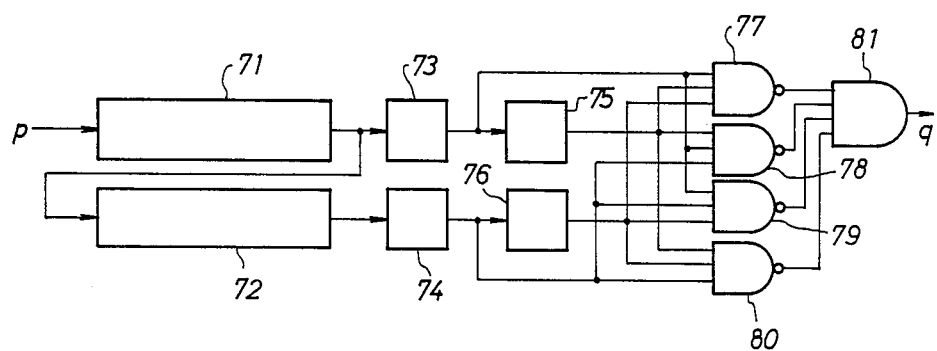
FIG. 14 is block diagram of a circuit for correcting the output of the circuit of FIG. 13.

FIG. 14 shows one example of a circuit of the determination correcting unit 13 for correcting the result of area determination obtained from the area determination unit 12. In FIG. 14, designated at 71 is a first line memory, at 72 second line memory, at 73-76 latches, at 77-80 are NAND gates, and at 81 is an AND gate.

The area determination signals P for every block of 8×8 size sequentially issued from the area determination unit 12 are inputted to the first line memory 71 and the second line memory 72 in order. As a result, the area determination signals P for every block of 8×8 size on the 1st-8th lines are stored in the second line memory 72, and the area determination signals P for every block of 8×8 size on the 9th-15th lines are stored in the first line memory 71. Then, the area determination signals P in the first line memory 71 are sequentially delivered therefrom to the latches 73, 75, and at the same time the area determination signals P in the second line memory 72 are sequentially delivered therefrom to the latches 74, 76. As a result, the four latches 73-76 hold the area determination signals P for four blocks adjacent to each other, as shown in FIG. 8. The NAND gates 77-80 and the AND gate 81 jointly function to correct the area determination. More specifically, if at least three among the adjacent four blocks are determined to be dot areas, the particular block of interest is regarded as dot area and a signal q is set to logical 0. If two or less blocks are determined to be dot areas, the particular block of interest is regarded as non-dot area and the signal q is set to logical 1.

Figure 15:
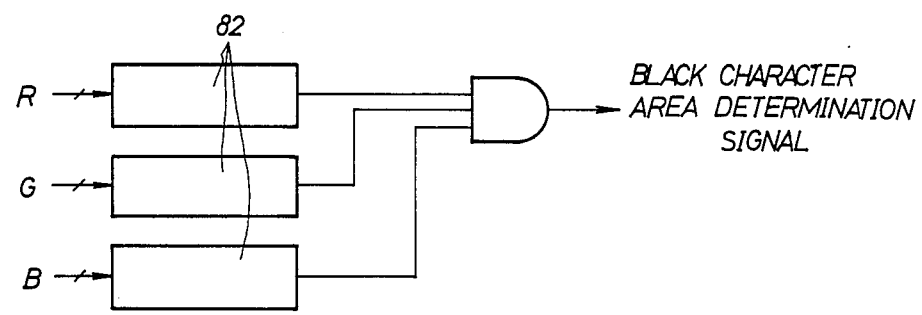
FIG. 15 is a circuit diagram for implementing a later-described algorithm A.

The method of detecting whether or not the area consisted of the predetermined number of pixels is a black character area representing a black character will be described below with reference to FIGS. 15 and 16.

When a black image is read and separated into three primary colors; R (red), G (green) and B (blue), these three color components have the same magnitude. Therefore, in case a black character has been printed on the white background, when the area is determined to be a character area for all of color components R, G and B, it can be regarded as a black character area (This will be referred to as algorithm A hereinafter). FIG. 15 shows a circuit for implementing the algorithm A. In FIG. 15, designated at 82 is an area determination circuit for determining whether or not the relevant area is a character area.

Another method of detecting a black character area will now be described. The minimum value of magnitudes of respective color components min (R, G, B) ($=\overline{max(R,G,B)}$) in the area represents the magnitudes of black component in that area. Therefore, if the area is determined to be a character area with respect to the component $\overline{max(R, G, B)}$, it can be regarded as a black character area (This will be referred to as algorithm B hereinafter). FIG. 16 shows a circuit for implementing the algorithm B. In FIG. 16, designated at 83 is a $\overline{max(R, G, B)}$ calculation circuit and at 84 is an area determination circuit.

Assuming that the respective color components have a magnitude represented by 8-bit data, those data can take the values in the area from 0-255 respectively. The symbols max(R,G,B) and min(R,G,B) respectively represent the maximum value and the minimum value with the symbol $\overline{R}$ representing $\overline{R}$32 R max−R if the probable maximum value taken by R is equal to R max. In the case where the symbol R is represented by the 8-bit data, because the symbol R max takes the value of 255, when A=100, $\overline{A}$32 255 - 100=155.

In a similar manner $\overline{max(R,G,B)}=255-max(R,G,B)$.

However, in the case where the symbols are represented by 6-bit data, since the probably maximum value taken by R, G and B is equal to 63, the following equation is realized:

$$\overline{max(R,G,B)}=63-max(R,G,B).$$

Figure 16:
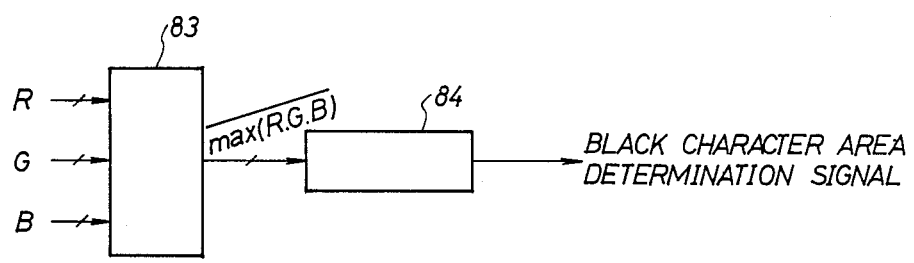
FIG. 16 is a circuit diagram for implementing a later-described algorithm B.

The unit 84 of FIG. 16 is an area determination circuit on the basis of the edge picture element density shown in FIG. 3.

Color correction necessary for the color image processing device of the present invention will be described below.

When reproducing an image in full color, three types color materials, i.e., Y (yellow), M (magenta) and C (cyan), or four types color materials including Bk (black) in addition to the above are usually employed This equally applies to silver salt prints as well as general prints using process ink. Ideal characteristics of Y, M and C color materials are such that they absorb 100% of R, G and B light beams, respectively, but reflect or transmit 100% of light beams in other colors. In actually, excepting Y, both M and C color materials are far from the ideal characteristics. The following Table 1 indicates the optical density of Y, M and C color materials in case of usual process ink with respect to R, G and B light beams (Yule, "Theory of Color Reproduction", p32, issued on Feb. 5, 1971).

TABLE 1

|   | R | G | B |
|---|---|---|---|
| C | 1.30 | 0.41 | 0.15 |
| M | 0.11 | 1.05 | 0.57 |
| Y | 0.01 | 0.07 | 1.00 |

Table 1 represents, respectively, the optical densities of the coloring materials C, M and Y for the light rays R, G and B. According to the embodiment of Table 1, the cyan-colored ink (C) has optical densities 1.30, 0.41 and 0.15, respectively, for the light rays R, G and B. The relationship between the optical density D and the reflection coefficient Ref is expressed by the equation:

$$D=\log(1/Ref).$$

The reflection coefficients of C, M and Y for R, G and B converted to the other values by use of the above-mentioned equation are illustrated in Table 2.

TABLE 2

| | (unit: percentage (%)) | | |
|---|---|---|---|
| | Light Rays | | |
| Coloring Materials | R (Red) | G (Green) | B (Blue) |
| C (Cyan) | 5.0 | 38.9 | 70.8 |
| M (Magenta) | 77.6 | 8.9 | 26.9 |
| Y (Yellow) | 97.7 | 85.1 | 10.0 |

Because C, M and Y are respectively, the complementary colors of R, G and B, the ideal characteristics of the coloring material C, M and Y is that the respective one of light rays R, G and B is completely absorbed (the reflection coefficient: 0%, the optical density: infinity), and the other respective two light rays are completely reflected (reflection coefficient: 100%, the optical density: 0). In the Table 2, as shown above, the reflection coefficient of the coloring material of cyan for the light rays G (green) is only 38.9%. This value is far from the ideal value of 100%. Because absorption of the light rays G is the role of the magenta coloring material, it follows that cyan has many of the characteristics as the coloring material of magenta In a similar manner, the reflection coefficient of the coloring material magenta for the light rays B (blue) is only 26.9% and therefore the coloring material has many characteristics of the Yellow absorbing the light rays B. Furthermore, the coloring material of yellow has a high reflection coefficient, 97.7% and 85.1%, respectively, for the light rays R and G. This means that it has a comparatively preferable characteristic. In other words, the yellow coloring material contains a low percentage of cyan-colored component and a low percentage of magenta-colored component.

As will be seen from Tables 1 and 2, Y is relatively close to the ideal characteristics, while C and M contain substantial amounts of M and Y components, respectively. Meanwhile, when printing colored characters, necessary color materials out of Y, M and C are superimposed as appropriate. For example, the character in green is expressed by superimposing C and Y ink. Since C ink contains the substantial amount of M component as mentioned above, ideal green color (100% reflection of only G light beam) cannot be attained But the resulting color belongs to the category of green in visual sense, and hence there is, practically speaking, no problem.

However, when that green color made by superimposing C and Y ink is subjected to color separation into R, G and B, the relevant area may be determined to be a character area for not only R, B data but also G data as a result of area determination using the above-mentioned algorithm A since the C ink contains the substantial amount of M component. Thus, there is a fear, for example, that the algorithm A may determine the green character to be a black character. For the same reason, the blue character (C +M) may be determined to be a black character. In case of using the algorithm B too, the substantial amount of black component is extracted from the green character, for example, which leads to a possibility that the green character may also be determined to be a black character similarly to the algorithm A.

As for process ink as described in connection with Table 1, there exists the following relationship between the transferred amounts C, M, Y of respective ink of C, M, Y color materials and their optical density $\bar{R}\ \bar{G}\ \bar{B}$ with respect to R, G, B light beams:

$$\begin{bmatrix} R \\ G \\ B \end{bmatrix} = \begin{bmatrix} 1.30 & 0.41 & 0.15 \\ 0.11 & 1.05 & 0.57 \\ 0.01 & 0.07 & 1.00 \end{bmatrix} \begin{bmatrix} C \\ M \\ y \end{bmatrix} \qquad \text{Eq. 1}$$

Therefore, the transferred amounts C, M and Y of respective ink are given by the following equation from the inverse matrix of the matrix in the above Eq. 1.

$$\begin{bmatrix} C \\ M \\ Y \end{bmatrix} = \begin{bmatrix} 0.80 & -0.31 & 0.06 \\ -0.08 & 1.02 & -0.57 \\ 0.00 & -0.07 & 1.04 \end{bmatrix} \begin{bmatrix} R \\ G \\ B \end{bmatrix} \qquad \text{Eq. 2}$$

Thus, the accuracy of area determination can be improved by implementing the algorithms A, B based on C, M and Y components given by Eq. 2 in place of R, G and B color components directly ready by the scanner.

Several embodiments of the color image processing device of the present invention will be described below.

Figure 17A:
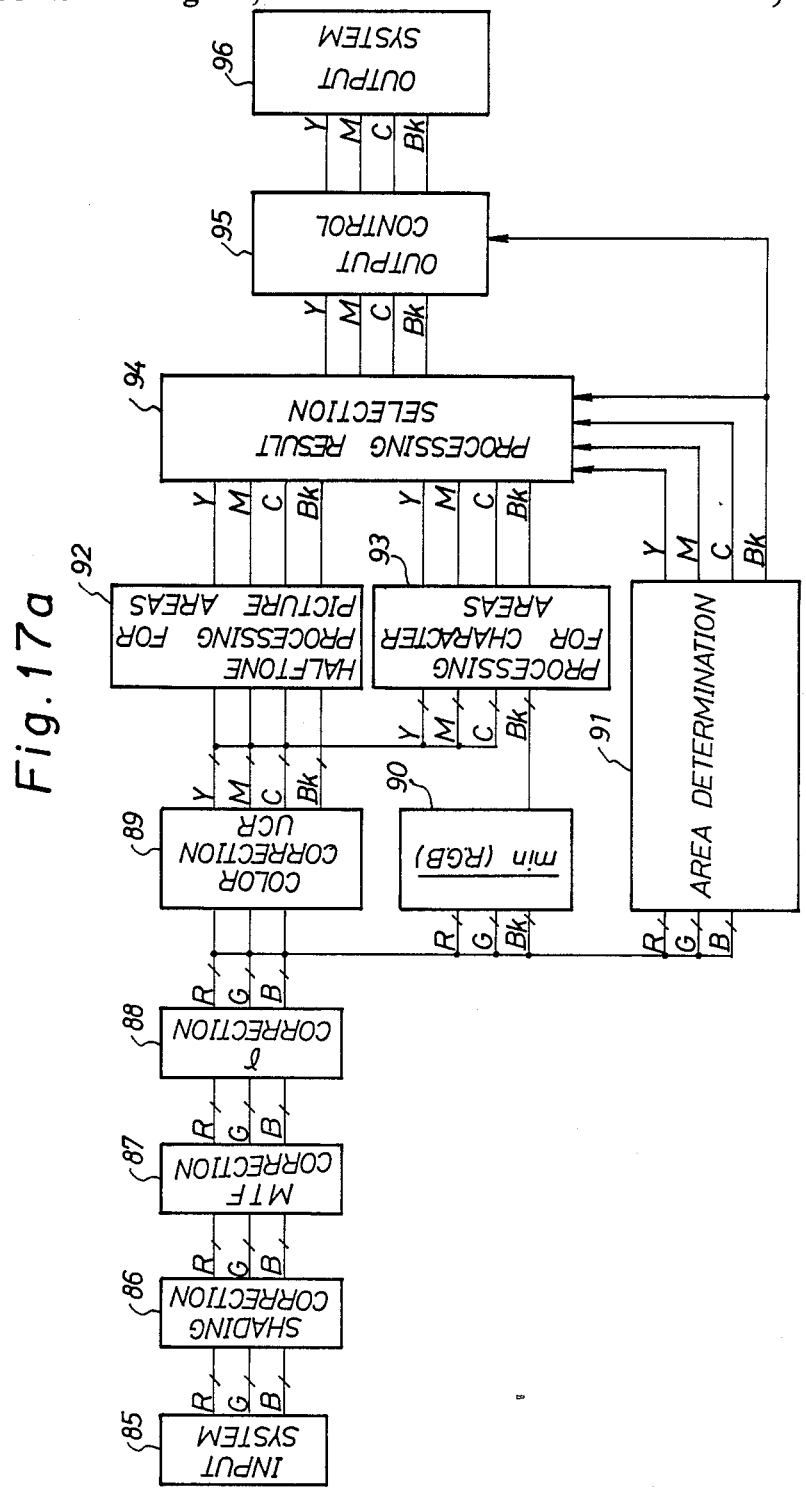

FIG. 17(a) shows an embodiment in which the black character area determination is made by the algorithm A which utilizes $\overline{\min(R, G, B)}$ data as black data Bk. This embodiment is effective for the area determination in case black characters are printed on the white background In FIG. 17(a), designated at 85 is an input system (scanner), at 86 shading correction circuit, at 87 MTF correction circuit, at 88 γ correction circuit, at 89 color correction/UCR processing circuit, at 90 $\overline{\min(R, G, B)}$ calculation circuit, at 91 area determination circuit, at 92 halftone processing circuit for picture areas, at 93 processing circuit for character areas, at 94 processing result selection circuit, at 95 output control circuit, and at 96 is an output system.

In a digital color copier, each of the elements including the shading compensation, gamma compensation, color compensation, UCR, and dither processing are fundamental construction elements known individually in the art.

The British Patent GB-2,141,001 discloses the contents of a digital color copier whose specification discusses and illustrates each of the above-mentioned construction elements.

The data read by the input system (scanner) 85 and separated into R, G and B colors are subjected to shading correction, MTF correction, and γ correction. After undergoing these correction steps, the R, G and B data are inputted to the color correction/UCR processing circuit 89, the $\overline{\min (R, G, B)}$ calculation circuit 90, and the area determination circuit 91 successively.

In the color correction/UCR processing circuit 89, color correction (masking) processing is performed in accordance with characteristics of the color materials used in the output system, and UCR processing is performed as required. Y, M, C and Bk data outputted from the color correction/UCR processing circuit 89 are inputted to each of the halftone processing circuit 92 for picture areas and the processing circuit 93 for character areas. The Bk data inputted to the processing circuit 93 for character areas is given by the $\overline{\min(R, G, B)}$ data.

The halftone processing circuit 92 for picture areas functions to carry out binary coding processing (or possibly multi-value coding processing such as three- and four-value) by making use of the systematic dither method, the error diffusion method, or the like which can provide the improved tone characteristics. The processing circuit 93 for character areas functions to carry out binary coding processing with much importance attached to resolution. As processing methods attaching importance to resolution, there have been practiced the dither processing using a diffusion type pattern such as Bayer type, or the binary coding processing with a fixed threshold.

The produce image obtained by the difference of the Dither pattern by use of the systematic Dither processing method, the difference in the image quality, and the error spreading (diffusion) method are described in "Kodera; Digitalization of the Halftone Image; TV Academy Journal, volume 40, no. 4 (1986)". The Bayer type pattern, the representative one of the Dots Dispersion (Divergence) type Dither pattern is disclosed in "B. E. Bayer; ICC Conference Record, 26, pages 11-15 (1973)".

The error spreading method is disclosed in "R. W. Floyd and I. Steinberg; Proc. SID, 17, pages 75-77 (1976)".

The systematic Dither method by use of the Dots Dispersion type Dither pattern is used for performing reproduction treatment of the character portion in the unit 93 shown in FIG. 17(a) because of its superior image resolution.

It is further noted that U.S. Pat. No. 4,742,400 discloses a method of changing over the Dots Dispersion type Dither pattern and the Dots Concentration type Dither pattern in accordance with the characteristics of the input image (the character portion or the picture image portion).

It must be noted that MTF compensation can be performed in the area determination circuit 91 or prior to that stage. In the embodiment shown in the FIGS. 17(a)-17(c) and 19, because the MFT compensation circuit is situated separate from the area determination circuit 91, it is not necessary to provide the MTF compensating portion in the area determination circuit 91. Furthermore, the FIGS. 1, 3 and 6 respectively show area determination circuits based on different algorithms. In the unit 91, the area discrimination is synthetically performed by use of these 3 types of circuits. That is, the circuits shown in FIGS. 1, 3 and 6 are the construction elements of the unit 91 with the exception of course being that the MTF compensation circuit is provided separately as indicated by the number 87 in the FIGS. 17(a)-17(c) and 19.

Following the result of area determination, the character portion processing result and the picture portion processing result are selectively applied to the character area and the picture area, respectively, by the processing result selection circuit 94. In addition, to reproduce black characters by a black material alone, the output control circuit 95 at the next stage functions so that Y, M and C data will not be outputted for those areas which have been determined to be black character areas In the area determination circuit 91, it first carries out area determination for each of R, G and B data using the algorithms 1, 2 or 3. Those area which have determined to be picture areas based on the algorithms 1, 2 or which have determined to be dot areas based on the algorithm 3, are regarded as picture areas, while the remaining areas are regarded as character areas. Further, those areas which have been determined to be character areas for all of R, G and B colors, are regarded as black character areas FIG. 17(b) shows an embodiment in which black character areas are detected based on the algorithm B. This embodiment is effective for the area determination in case black characters are printed on the colored background. The difference from the embodiment of FIG. 17(a) mentioned above is in that the area determination circuit 91 utilizes $\overline{max(R, G, B)}$ data resulted from a $\overline{max(R, G, B)}$ calculation circuit 97 as black data Bk.

As an alternative, $\overline{max(R, G, B)}$ may be calculated in the area determination circuit 91 using the R, G and B data which are applied thereto The circuit 91 makes determination as to whether the area is a picture area or a character area for black data based on the algorithm B using the $\overline{max(R, G, B)}$ data. It also makes determination as to whether the area is a picture area or a character area for R, G and B data based on a combination of the algorithms 1, 2 and 3.

The algorithm A can make area determination for black character printed on the white background more correctly compared to the algorithm B. But the algorithm A cannot make area determination for black characters printed on the colored background. For example, in case black characters are present on the yellow background, character areas cannot be detected by any way for the B data. Thus, even if the relevant area is determined to be a character area for both the R and G data, that area will not be determined to be a black character area because it cannot be determined to be a character area for the B data. On the other hand, even in such a case of black characters printed on the colored background, the algorithm B using the black component data makes it possible to correctly detect black character areas, because the background (e.g., yellow) contains no black component. Therefore, black character areas can be extracted more correctly by utilizing both of the algorithm A and B.

Figure 17C:
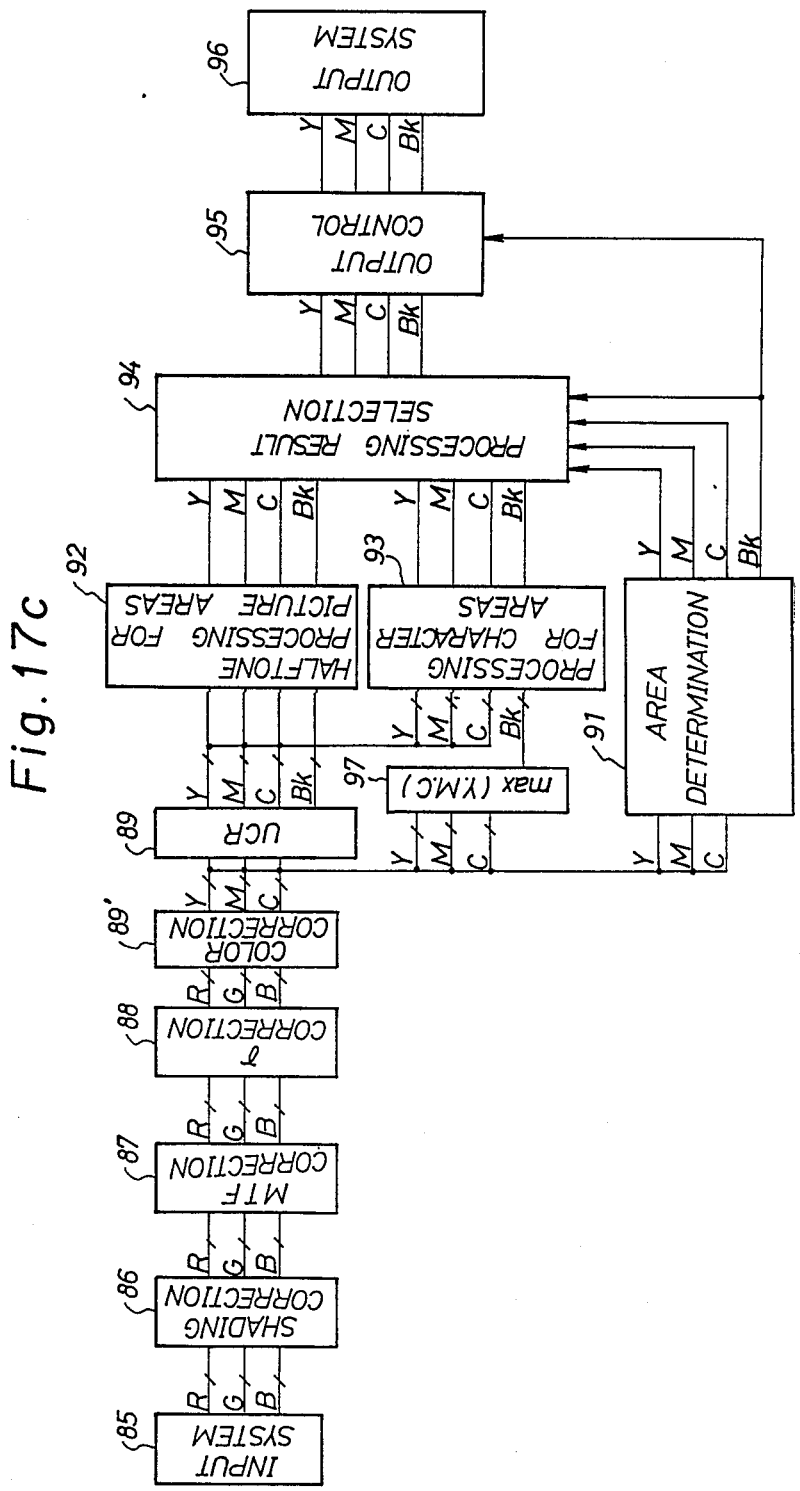

FIG. 17(c) shows an embodiment in which area determination is made using the algorithm A based on Y, M and C data which have been subjected to color correction in view of spectroscopic characteristics of ink, in place of the R, G and B data. The circuit diagram of this embodiment is different from that of FIG. 17(a) in a color correction circuit 89' and a max(Y, M, C) calculation circuit 97.

FIG. 18(a) and 18(b) show block diagrams of color correction circuits. In FIG. 18(a), designated at 97-99 are latches, at 100-108 ROMs, at 109-111 adders, and at 112-114 are latches.

The color correction equation is given as follows:

$$\begin{bmatrix} C \\ M \\ Y \end{bmatrix} = \begin{bmatrix} a11 & a21 & a31 \\ a12 & a22 & a32 \\ a13 & a23 & a33 \end{bmatrix} \begin{bmatrix} R \\ G \\ B \end{bmatrix}. \qquad \text{Eq. 3}$$

From the above Eq. 3, C, M and Y values after correction are given by the following Eqs. 3-(1) to (3):

$$C = a11 * \overline{R} + a21 * \overline{G} + a31 * \overline{B} \quad \text{Eq. 3-} \qquad (1)$$

$$M = a12 * \overline{R} + a22 * \overline{G} + a32 * \overline{B} \quad \text{Eq. 3-} \qquad (2)$$

$$Y = a13 * \overline{R} + a23 * \overline{G} + a33 * \overline{B} \quad \text{Eq. 3-} \qquad (3).$$

In the embodiment of FIG. 18(a), multiplications of Eqs. 3-(1) to (3) are carried out by the table reference technique using ROMs. For example, the result of calculating a22*$\overline{G}$ is stored in the address $\overline{G}$ (or possibly G) of the ROM 104. The adders 109-110 carry out additions of Eqs. 3-(1)-(3), respectively. As a result, the adders 109-110 output the values of C, M and Y, respectively.

Referring to FIG. 18(b), designated at 115-117 are latches, at 118-120 ROMs, at 121 adder, at 122-127 latches, and at 128-130 are delay circuits.

In this embodiment, arithmetic operations of the above Eqs. 3-(1) to (3) are carried out in a time sharing manner to decrease the number of ROMs and adders used.

Operation of the circuit shown in FIG. 18(b) will be described below with reference to a time chart shown in FIG. 18(c). $\overline{R}$ $\overline{G}$ and $\overline{B}$ data prior to color correction are held in the latches 115–117 in synchronization with pixel clocks, respectively. Inputted to the ROMs 118–120 are a color selection signal (S1, S0) of 2 bits and the $\overline{R}$ $\overline{G}$ and $\overline{B}$ data as address signals. The color selection signal (S1, S0) periodically repeats its logical values (0, 0), (0, 1) and (1, 0) per ⅓ clock period. The ROM 118 outputs the values of a11*$\overline{R}$ a12*$\overline{R}$ and a13*$\overline{R}$ successively upon the color selection signal having logical values (0, 0), (0, 1) and (1, 0), respectively. At the same time, the ROMs 119 and 120 output successively the values of a21*$\overline{G}$ a22*$\overline{G}$ a23*$\overline{G}$ and a31*$\overline{B}$ a32*$\overline{B}$ a33*$\overline{B}$ in a like manner, respectively.

The adder 121 outputs the sum of output values of the ROMs 118–120. In other words, C, M and Y data having been subjected to color correction are outputted successively in response to logical values (0, 0), (0, 1) and (1, 0) of the color selection signal from the adder 121. The latches 122–124 respectively hold the values of C, M and Y data which are outputted from the adder 121 in synchronization with clocks out of phase by ⅓ pixel clock period with respect to each other. The latches 125–127 respectively latch the C, M and Y data outputted from the latches 122–124 in phase. This permits the C, M and Y data of the same pixel to be referred simultaneously from the latches 125–127.

Figure 19:
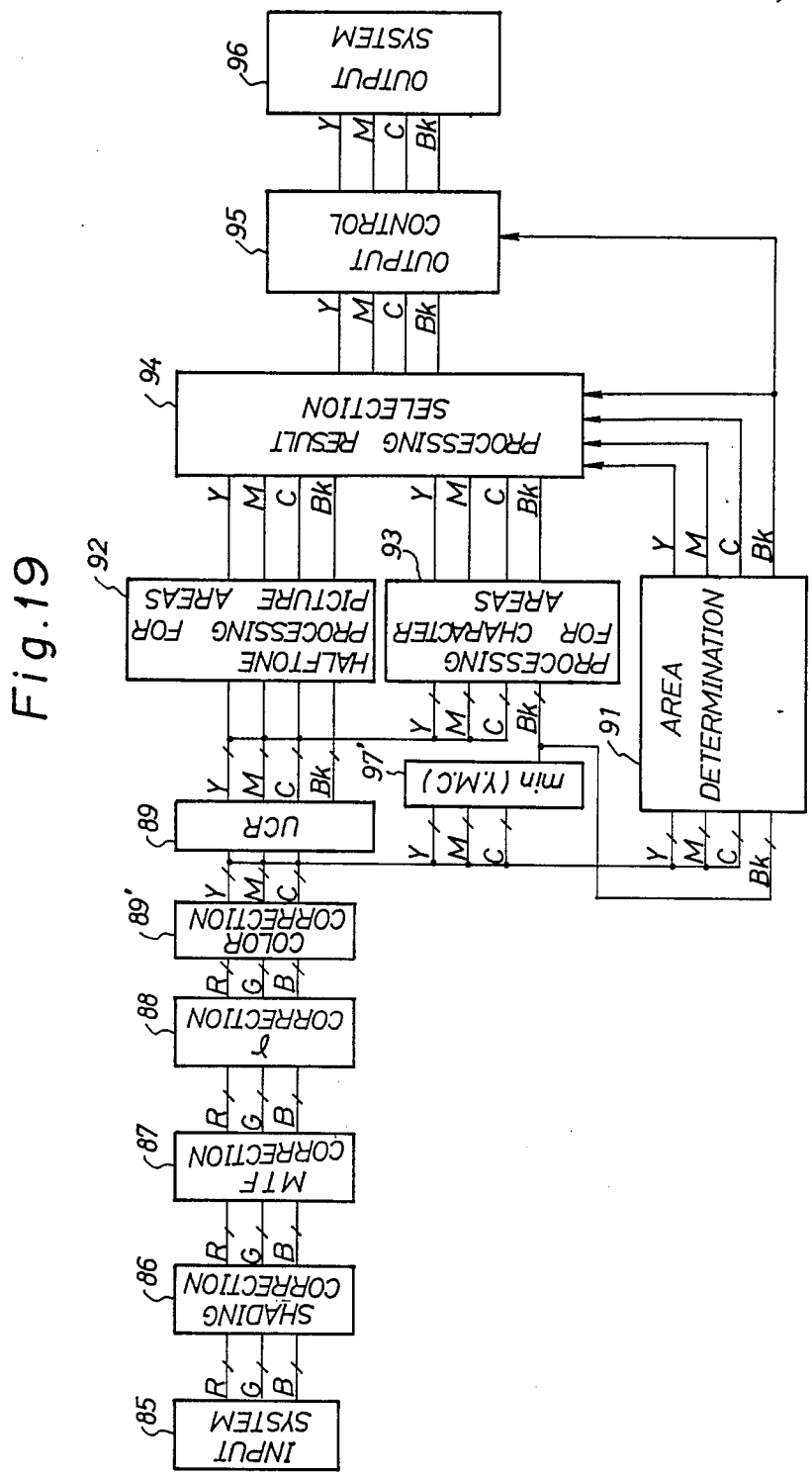

FIG. 19 shows an embodiment in which black character areas are detected based on the algorithm B which utilizes the Y, M and C data having been subjected to color correction. The difference from the circuit diagram shown in FIG. 17(a) is in a color correction circuit 89′ and a min(Y, M, C) calculation circuit 97′. Alternatively, if the color correction/UCR processing circuit 89 is configured to carry out 100% UCR, the Bk data outputted from the color correction/UCR processing circuit 89 could be used as black component data.

Figure 20A:
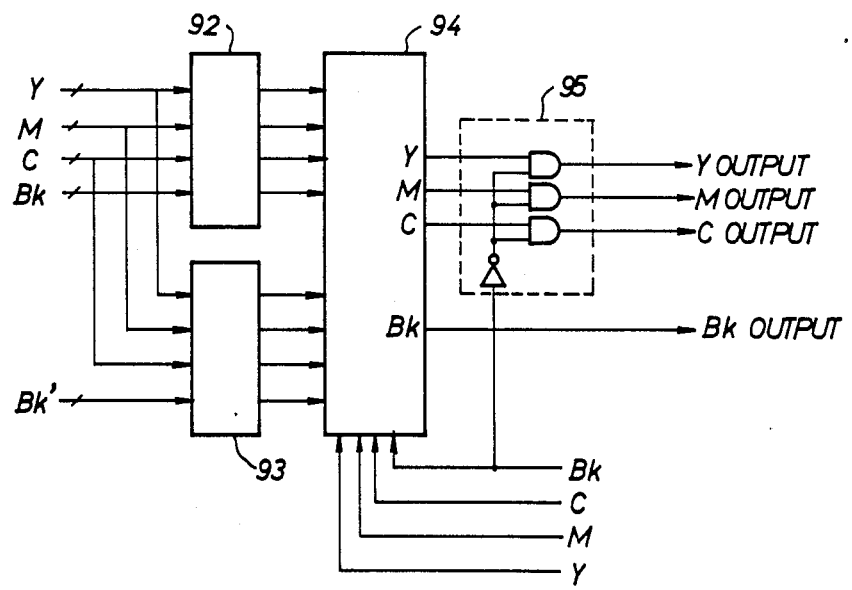
FIGS. 20(a)–20(c) are circuit diagrams for explaining output control circuits used in the embodiments of FIGS. 17(a)–17(c) and FIG. 19 according to the present invention.

FIG. 20(a) shows the output control circuit 95 in detail for use in each of the embodiments of the present invention shown in FIGS. 17(a)–17(c) and FIG. 19.

The processing result selection circuit 94 transfers the output of the character area processing circuit 93 to the control circuit 95 when the image read by the scanner has been determined to be a character area, and transfers the output of the picture area processing circuit 92 to the control circuit 95 when it has been determined to be picture area. When the read image has been determined to be a black character area, the output control circuit 95 will not output any Y, M and C data.

Figure 20B:
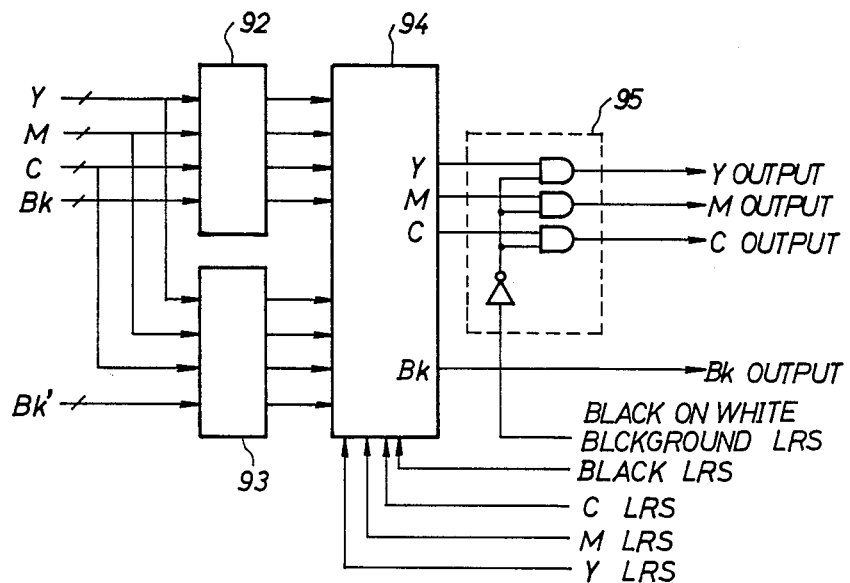

FIG. 20(b) shows an example in which the output control circuit 95 will not output any Y, M and C data when the read image has been determined to be a black character printed on the white background.

Figure 20C:
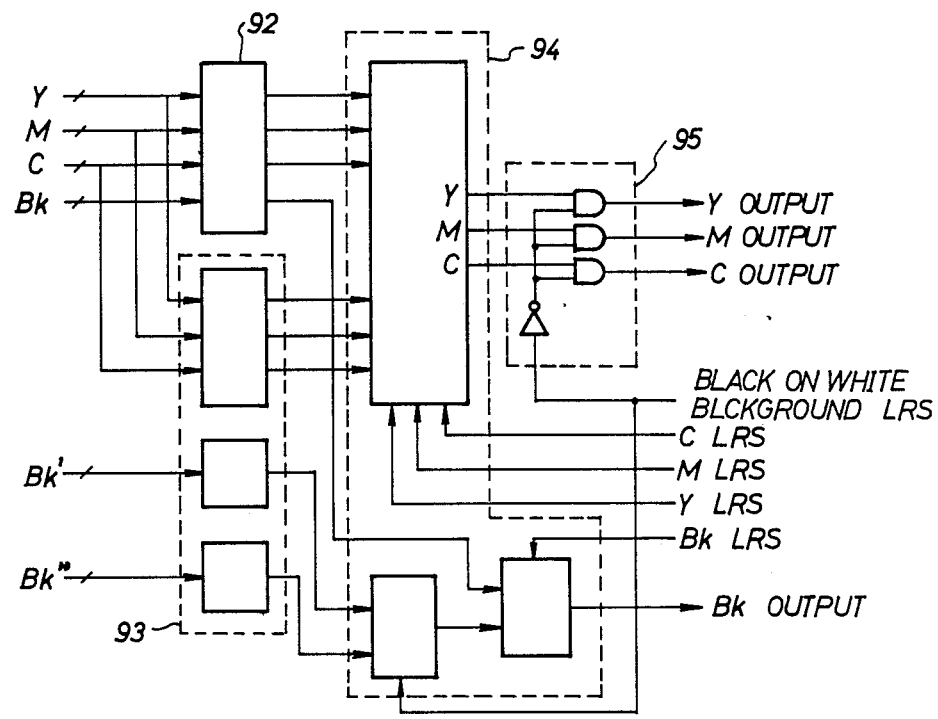

FIG. 20(c) shows an example in which the output control circuit 95 will not output any Y, M and C data when the read image has been determined to be a black character printed on the white background, and $\overline{\min(R, G, B)}$ or max(Y, M, C) is used as the black component data Bk′ for the character area processing circuit 93 in case of black characters printed on the white background, or $\overline{\max(R, G, B)}$ or min(Y, M, C) is used as the black component data Bk″ for the same circuit 93 in case of black characters printed on the colored background. This example can prevent the occurrence of blur and notches of the black characters printed.

Figure 21A:
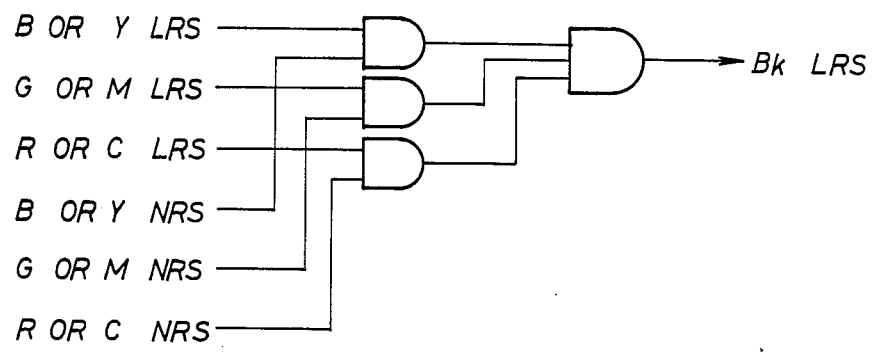
FIGS. 21(a)–21(d) are block diagrams showing a later-described black character area signal generator and a later-described black character on white background area signal generator.
Figure 21B:
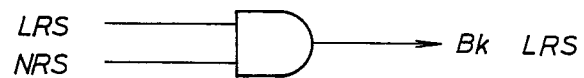

FIGS. 21(a) and 21(b) show circuits for implementing the above-mentioned algorithms A and B, respectively.

In these figures, LRS is a signal indicative of character area and NRS is a signal indicative of a dot area.

Figure 21C:
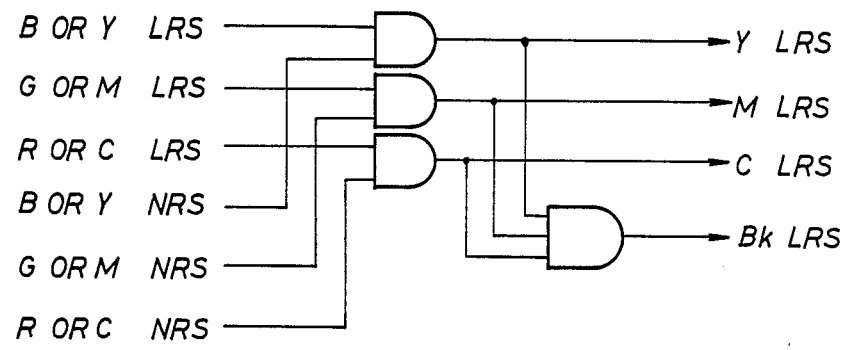

FIG. 21(c) shows a circuit for implementing the algorithm A and outputting characters area signals for the respective color components.

Figure 21D:
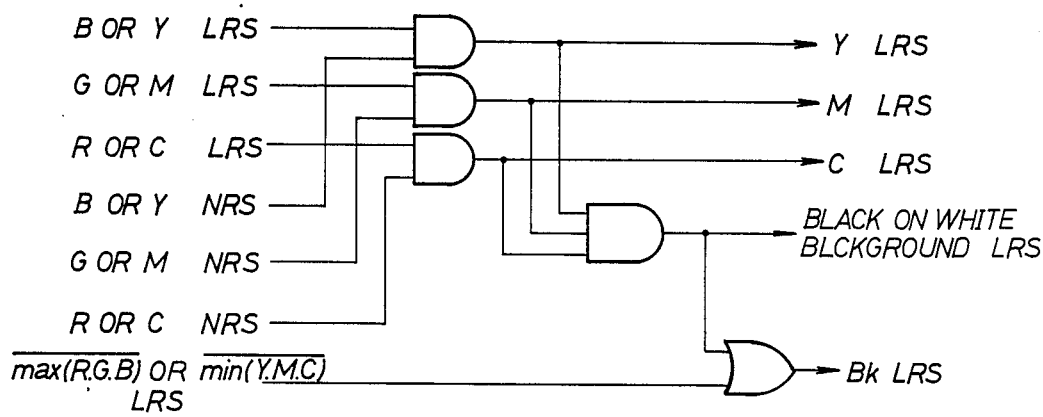

FIG. 21(d) shows a circuit for outputting the logical sum of algorithms A and B.

The present invention has been described in connection with the preferred embodiments. But the present invention is not limited to the foregoing embodiments, and various modifications and changes can be made by those skilled in the art without departing the scope of the present invention.

What is claimed is:

1. A color image processing device comprising:
    read means for reading an original image for each area containing a predetermined number of pixels of the original image and color-separating the read area into red, green and blue components;
    character area detection means for detecting whether or not the read area is a character area constituting a part of a character in the original image for each of the red, green and blue components;
    black character area determination means adapted to determine the read area to be a black character area constituting a part of a black character in the original image if said read area is detected to be the character area for all of the red, green and blue components by the character area detection means; and
    output means for outputting yellow, magenta, cyan, and black data corresponding to said red, green and blue components used for reproducing said read area, said output means being adapted to output the black data while inhibiting the yellow, magenta and cyan data from being outputted therefrom when said read area is determined to be the black character area.

2. A device according to claim 1, in which the character area detection means is adapted to detect the area to be the character area if a number of pixels in said area having density level larger than a background density level of the original image is more than a predetermined number.

3. A device according to claim 1, in which the character area detection means is adapted to detect the area to be the character area if a number of pixels in said area each having density slope with respect to surrounding pixels thereof larger than a predetermined value is more than a predetermined number.

4. A device according to claim 1, in which the character area detection means comprises dot area detection means for detecting the area to be a dot area comprised of dots for representing half tone, and adapted to detect the area not to be the character area if the dot area detection means detects the area to be the dot area.

5. A device according to claim 1, in which the character area detection means is adapted to detect whether or not the area is the character area after applying color correction to the red, green and blue components in accordance with spectroscopic characteristics of color materials of the original image.

6. A device according to claim 1, in which the device has printing means adapted to print the black character with only a black color material when the output means outputs the black data.

7. A color image processing device comprising:

read means for reading an original image for each area containing a predetermined number of pixels of the original image and color-separating the read area into red, green and blue components;

black component extraction means for extracting the black component of the read area based on the red, green and blue components of the area separated by the read means;

character area detection means for detecting whether or not the read area is a character area constituting a part of a character in the original image for each of red, green, blue and black components;

black character determining means adapted to determine the read area to be a black character area constituting a part of a black character in the original image if said read area is detected to be the character of all of the red, green, and blue component, or for the black components by the character area detection means; and output means for outputting yellow, magenta, cyan, and black data corresponding to said red, green and blue components used for reproducing said read area, said output means being adapted to output the black data while inhibiting the yellow, magenta and cyan data from being outputted therefrom when said read area is determined to be the black character area.

8. A device according to claim 7, in which the black component extracting means is adapted to extract a minimum value of the red, green and blue components as the black component.

9. A device according to claim 7, in which the character area detection means is adapted to detect the area to be the character area if a number of pixels in said area having density level larger than a background density level of the original image is more than a predetermined number.

10. A device according to claim 7, in which the character area detection means is adapted to detect the area to be the character area if a number of pixels in said area each having density slope with respect to surrounding pixels thereof larger than a predetermined value is more than a predetermined number.

11. A device according to claim 7, in which the character area detection means comprises dot area detection means for detecting the area to be a dot area comprised of dots for representing half tone, and adapted to detect the area not to be the character area if the dot area detection means detects the area to be the dot area.

12. A device according to claim 7, in which the character area detection means is adapted to detect whether or not the area is the character area after applying color correction to the red, green and blue components in accordance with spectroscopic characteristics of color materials of the original image.

13. A device according to claim 7, in which the device has printed means adapted to the print the black character with only a black color material when the output means outputs the black data.

* * * * *